United States Patent
Orsini

(10) Patent No.: US 10,630,628 B2
(45) Date of Patent: Apr. 21, 2020

(54) SYSTEMS AND METHODS FOR MANAGING VEHICLES

(71) Applicant: Satori Worldwide, LLC, Palo Alto, CA (US)

(72) Inventor: Francois Orsini, San Francisco, CA (US)

(73) Assignee: SATORI WORLDWIDE, LLC, Palo Alto, CA (US)

( * ) Notice: Subject to any disclaimer, the term of this patent is extended or adjusted under 35 U.S.C. 154(b) by 0 days.

(21) Appl. No.: 16/195,603

(22) Filed: Nov. 19, 2018

(65) Prior Publication Data
US 2019/0297045 A1  Sep. 26, 2019

Related U.S. Application Data

(60) Provisional application No. 62/647,505, filed on Mar. 23, 2018.

(51) Int. Cl.
*G06F 15/16* (2006.01)
*H04L 12/58* (2006.01)
(Continued)

(52) U.S. Cl.
CPC .......... *H04L 51/20* (2013.01); *G01C 21/3407* (2013.01); *G01C 21/3697* (2013.01);
(Continued)

(58) Field of Classification Search
CPC ......... H04L 51/20; H04L 51/26; H04L 67/26; H04W 4/024; G01C 21/3407; G01C 21/3697
(Continued)

(56) References Cited

U.S. PATENT DOCUMENTS

2003/0195696 A1* 10/2003 Jones ............... G06Q 10/08
701/517
2004/0068364 A1 4/2004 Zhao et al.
(Continued)

FOREIGN PATENT DOCUMENTS

AU  2015210417 A1  2/2016

OTHER PUBLICATIONS

International Search Report and Written Opinion dated Feb. 27, 2019 for International application No. PCT/US2018/062109.

*Primary Examiner* — Brian Whipple
*Assistant Examiner* — Hannah S Wang
(74) *Attorney, Agent, or Firm* — Womble Bond Dickinson (US) LLP; Daniel E. Ovanezian

(57) ABSTRACT

Methods, systems, and apparatus, including computer programs encoded on a computer storage medium, for tracking or managing vehicles. One method includes receiving a first message on a first channel of a plurality of channels. The first channel may be associated with a vehicle that is traveling on a route. The first message may include a request to prioritize a first geographical location of the route. The method also includes determining whether the first geographical location can be prioritized. The method further includes publishing a second message to a second channel of the plurality of channels in response to determining that the first geographical location can be prioritized. The vehicle may be a subscriber to the second channel. The second message may indicate an updated route for the vehicle where the first geographical location is prioritized.

18 Claims, 19 Drawing Sheets

(51) Int. Cl.
*H04L 29/08* (2006.01)
*G01C 21/36* (2006.01)
*G01C 21/34* (2006.01)
*H04W 4/024* (2018.01)
*H04W 4/40* (2018.01)

(52) U.S. Cl.
CPC .............. *H04L 51/26* (2013.01); *H04L 67/26* (2013.01); *H04W 4/024* (2018.02); *H04L 51/14* (2013.01); *H04W 4/40* (2018.02)

(58) Field of Classification Search
USPC ........................................................ 709/206
See application file for complete search history.

(56) References Cited

U.S. PATENT DOCUMENTS

| | | |
|---|---|---|
| 2015/0149305 A1 | 5/2015 | Zhang |
| 2015/0200877 A1 | 7/2015 | Cuomo et al. |
| 2017/0126810 A1* | 5/2017 | Kentley ............... H04L 67/125 |
| 2017/0132934 A1* | 5/2017 | Kentley ................. G08G 1/202 |
| 2017/0180289 A1 | 6/2017 | Chiappone et al. |
| 2017/0262790 A1* | 9/2017 | Khasis ............... G01C 21/3415 |
| 2018/0060812 A1* | 3/2018 | Robinson ........... G06Q 10/0836 |
| 2018/0096287 A1* | 4/2018 | Senger ............ G06Q 10/08355 |
| 2018/0202822 A1* | 7/2018 | DeLizio ............. G01C 21/3407 |
| 2019/0066041 A1* | 2/2019 | Hance .................... B65G 1/137 |
| 2019/0138985 A1* | 5/2019 | Endo .................. G06Q 10/0833 |
| 2019/0164121 A1* | 5/2019 | Endo .................. G06Q 10/0832 |
| 2019/0164127 A1* | 5/2019 | Kataoka ........... G06Q 10/08355 |
| 2019/0173951 A1* | 6/2019 | Sumcad .................. H04L 67/26 |

\* cited by examiner

SYSTEMS AND METHODS FOR MANAGING VEHICLES

RELATED APPLICATION

This application claims the benefit of U.S. Provisional Application No. 62/647,505 filed Mar. 23, 2018, the contents of which are incorporated by reference.

BACKGROUND

This specification relates to a data communication system and, in particular, systems and methods for managing or tracking vehicles.

The publish-subscribe (or "PubSub") pattern is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Because publishers may publish large volumes of messages, and subscribers may subscribe to many topics (or "channels") the overall volume of messages directed to a particular channel and/or subscriber may be difficult to manage.

DETAILED DESCRIPTION

Elements of examples or embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

A system architecture for tracking and managing vehicles may include a messaging system. The messaging system may support the PubSub communication pattern and may allow publishers and subscribers to publish and receive live messages. Vehicles and users (who want to track vehicles or modify the routes of the vehicles) may be publishers and subscribers of the messaging system. Vehicles may publish messages to indicate the live geographical locations of the vehicles. Users may view the messages and may be able to view the live geographical locations of the vehicles as the vehicles travel through a geographical area.

Users may also publish live messages to request changes in the routes of the vehicles. The changes in the routes may include prioritizing a geographical location (e.g., requesting the vehicle to arrive at the geographical location at an earlier time or at a requested time), adding a geographical location to a route, or removing a geographical location from the route. The system architecture may receive these live messages (requesting changes in the routes) and may publish live messages with updated routes to the vehicles.

The implementations, embodiments, and examples described herein may allow users to more easily and more accurately determine when a vehicle will arrive at a geographical location by providing live messages indicating the live geographical locations of the vehicles. They may also allow users to better plan when they should arrive or be at the geographical locations. They may further allow users to request changes to the routes so that users may change the geographical locations of the route when the users are unable to go to a geographical location or want to be at a (same or different) geographical location at a certain time. They may further allow the vehicles to operate more efficiently (e.g., to not waste time or fuel traveling to a geographical location if the user is not going to be at the geographical location).

Figure 1A:
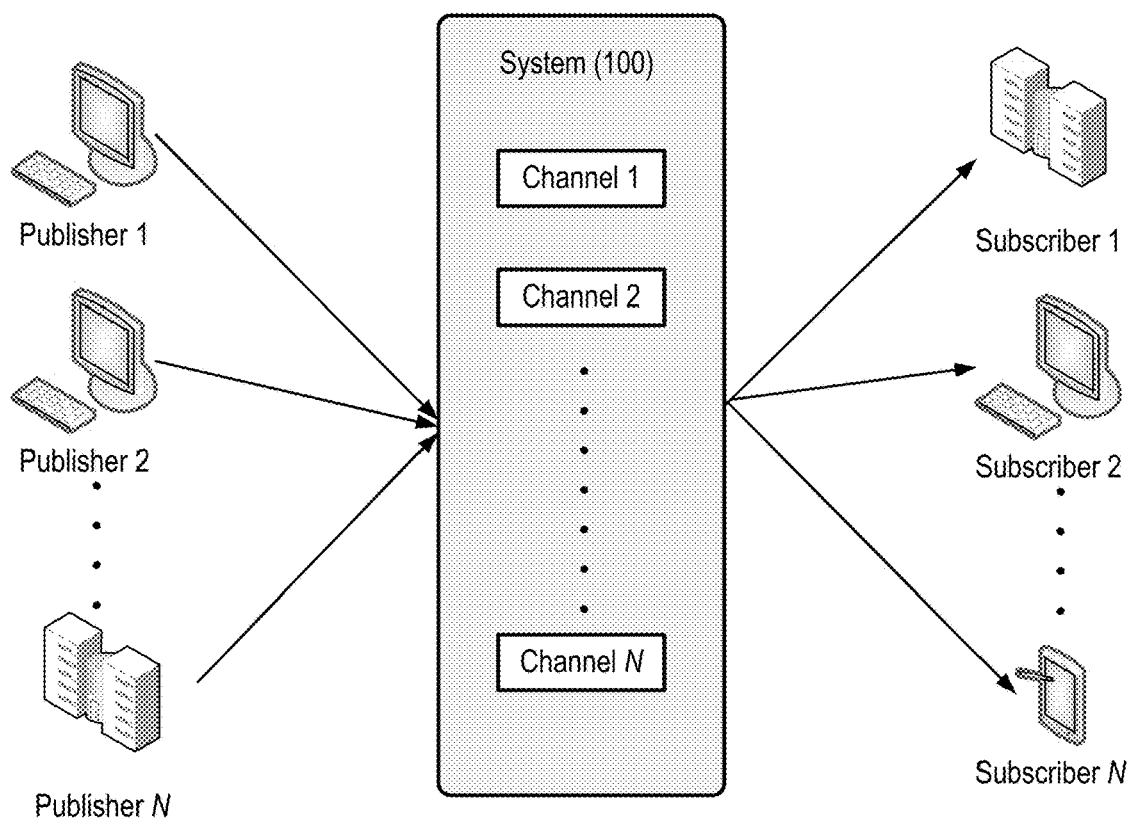
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

- One to One (1:1). In this configuration there is one publisher and one subscriber per channel. A typical use case is private messaging.
- One to Many (1:N). In this configuration there is one publisher and multiple subscribers per channel. Typical use cases are broadcasting messages (e.g., stock prices).
- Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
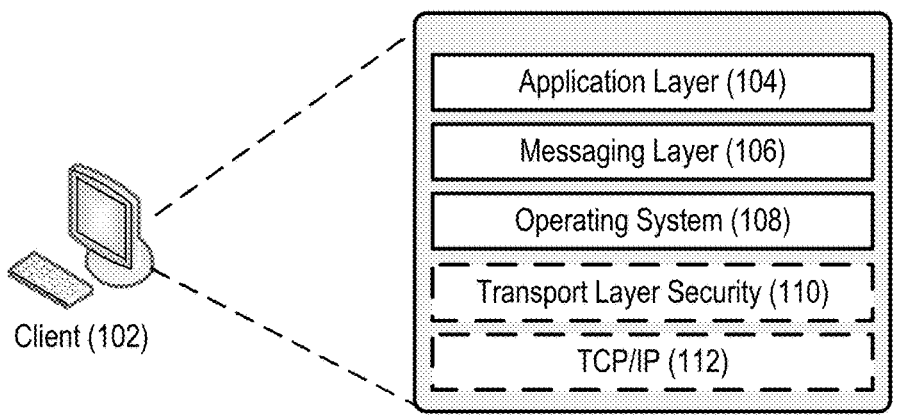
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
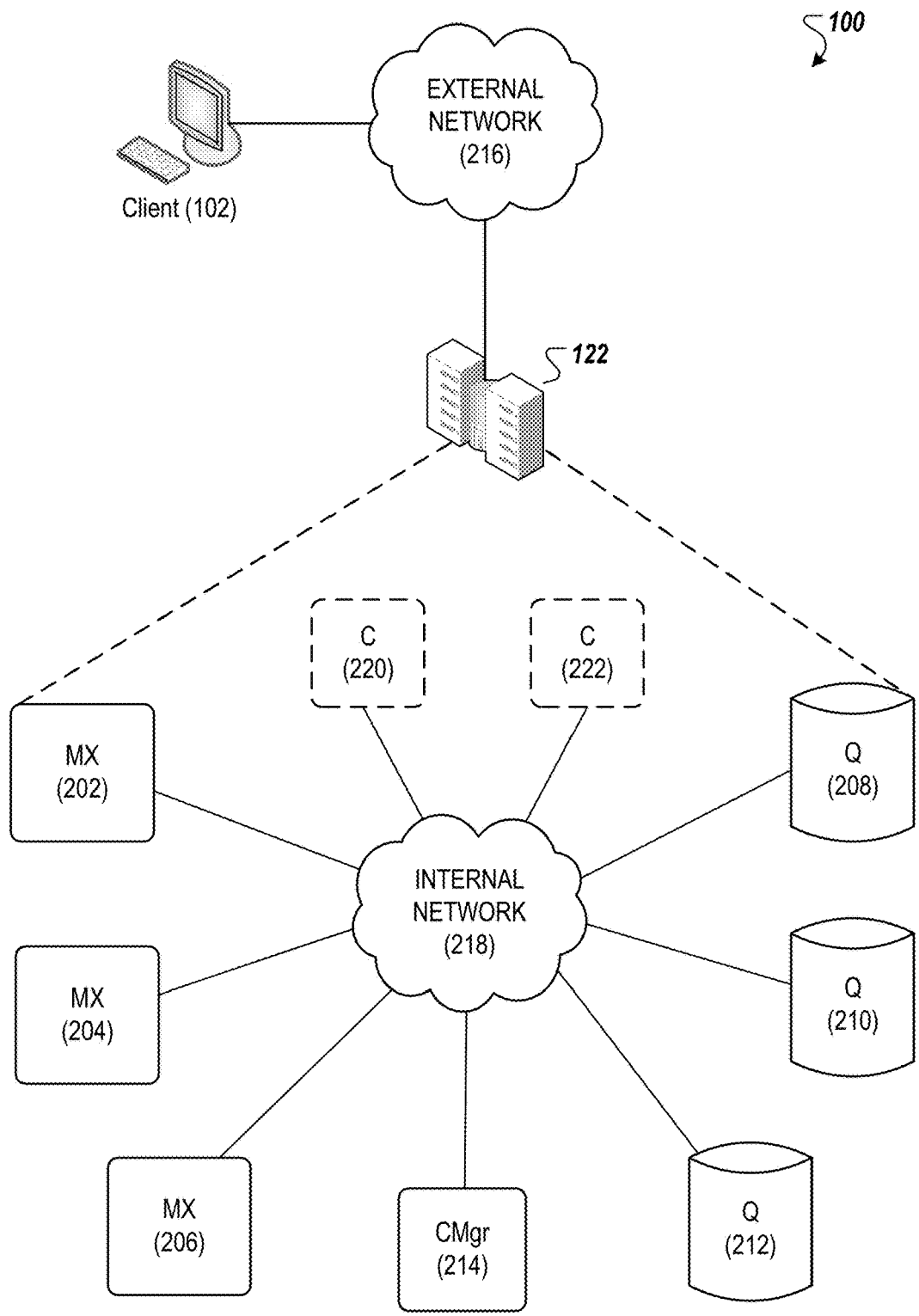
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more configuration manager nodes (e.g., configuration manager 214), and optionally one or more C nodes (e.g., C nodes or cache nodes 220 and 222). Each node can execute in a virtual machine or on a physical machine (e.g., a data processing apparatus). Each MX node can serve as a termination point for one or more publisher and/or subscriber connections through the external network 216. The internal communication among MX nodes, Q nodes, C nodes, and the configuration manager can be conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each configuration manager node is responsible for managing Q node load, for example, by assigning channels to Q nodes and/or splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a configuration manager (e.g., configuration manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a configuration manager to grant access to a streamlet for the channel from which messages are read. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the configuration manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a configuration manager node. The configuration manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the configuration manager to read from or write to a streamlet. The new grant will reference a different streamlet and will refer to the same or a different Q node depending on where the new streamlet resides.

Figure 3A:
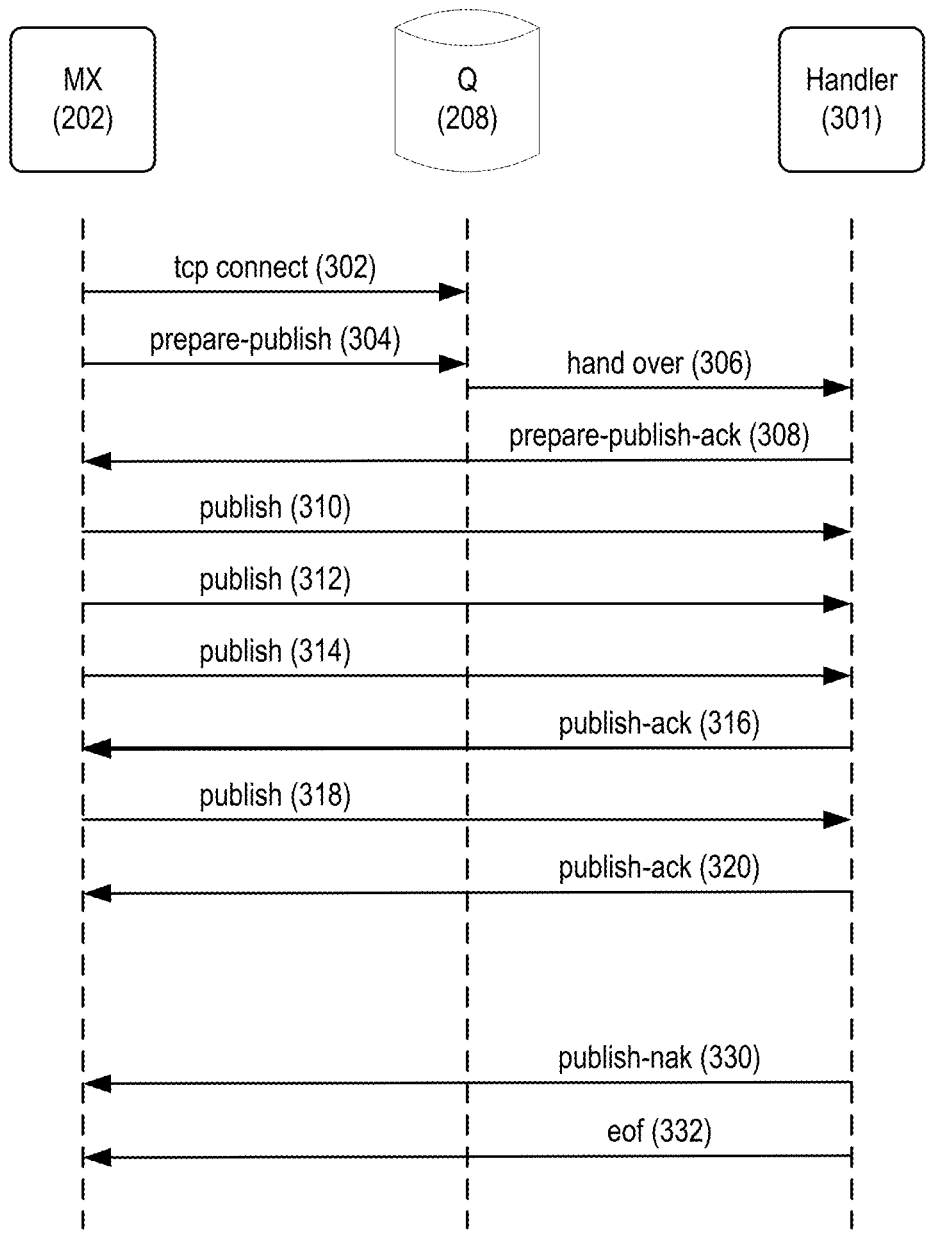
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a configuration manager (e.g., configuration manager 214), as described before, the MX node establishes a Transmission Control Protocol (TCP) connection with the Q node (e.g., Q node 208) identified in the grant response received from the configuration manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the configuration manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turn stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a configuration manager if the MX node has additional messages to store.

Figure 3B:
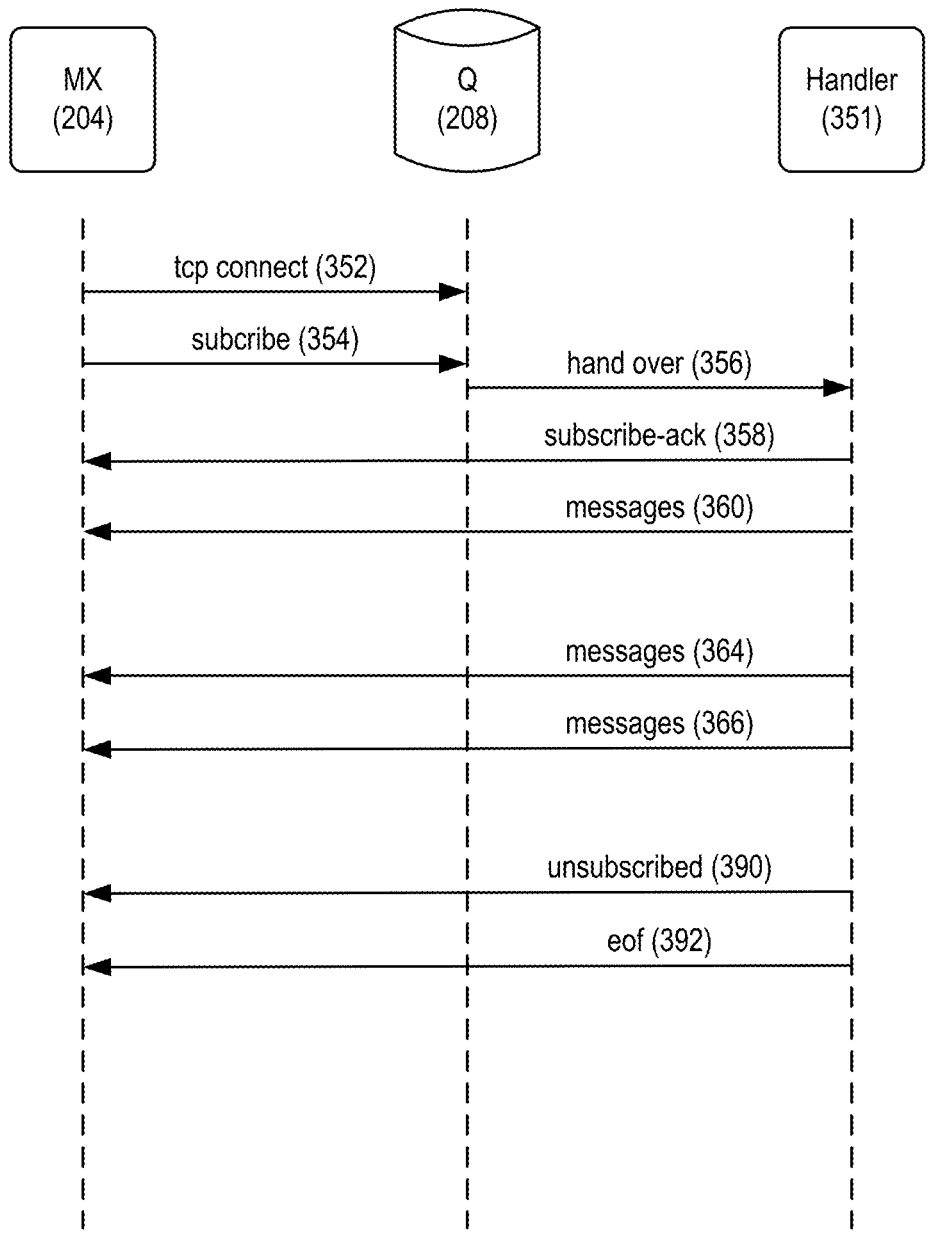
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a configuration manager (e.g., configuration manager 214) a request for reading a particular channel starting from a particular message or time offset in the channel. The configuration manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the configuration manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the configuration manager). The MX node can also close the association with the handler process if the MX node receives an unsubscribe message from a corresponding client device.

In various implementations, a streamlet can be written into and read from at the same time instance. For example, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a configuration manager) can read the streamlets from the C nodes instead.

As described above, messages for a channel in the messaging system 100 are ordered in a channel stream. A configuration manager (e.g., configuration manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The configuration manager can also balance load among Q nodes in the messaging system 100 by monitoring respective workloads of the Q nodes and allocating streamlets in a way that avoids overloading any one Q node.

In various implementations, a configuration manager maintains a list identifying each active streamlet, the respective Q node on which the streamlet resides, an identification of the position of the first message in the streamlet, and whether the streamlet is closed for writing. In some implementations, Q nodes notify the configuration manager and/or any MX nodes that are publishing to a streamlet that the streamlet is closed due to being full or when the streamlet's TTL has expired. When a streamlet is closed, the streamlet remains on the configuration manager's list of active streamlets until the streamlet's TTL has expired so that MX nodes can continue to retrieve messages from the streamlet.

When an MX node requests a write grant for a given channel and there is not a streamlet for the channel that can be written to, the configuration manager allocates a new streamlet on one of the Q nodes and returns the identity of the streamlet and the Q node in the StreamletGrantResponse. Otherwise, the configuration manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the configuration manager.

When an MX node requests a read grant for a given channel and there is not a streamlet for the channel that can be read from, the configuration manager allocates a new streamlet on one of the Q nodes and returns the identity of the streamlet and the Q node in the StreamletGrantResponse. Otherwise, the configuration manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 can send an EOF message (392) to any MX nodes that are subscribed to the streamlet.

In some implementations, the messaging system 100 can include multiple configuration managers (e.g., configuration manager 214 plus one or more other configuration managers). Multiple configuration managers can provide resiliency and prevent single point of failure. For instance, one configuration manager can replicate lists of streamlets and current grants it maintains to another "slave" configuration manager. As another example, multiple configuration managers can coordinate operations between them using distributed consensus protocols, such as, for example, Paxos or Raft protocols.

Figure 4A:
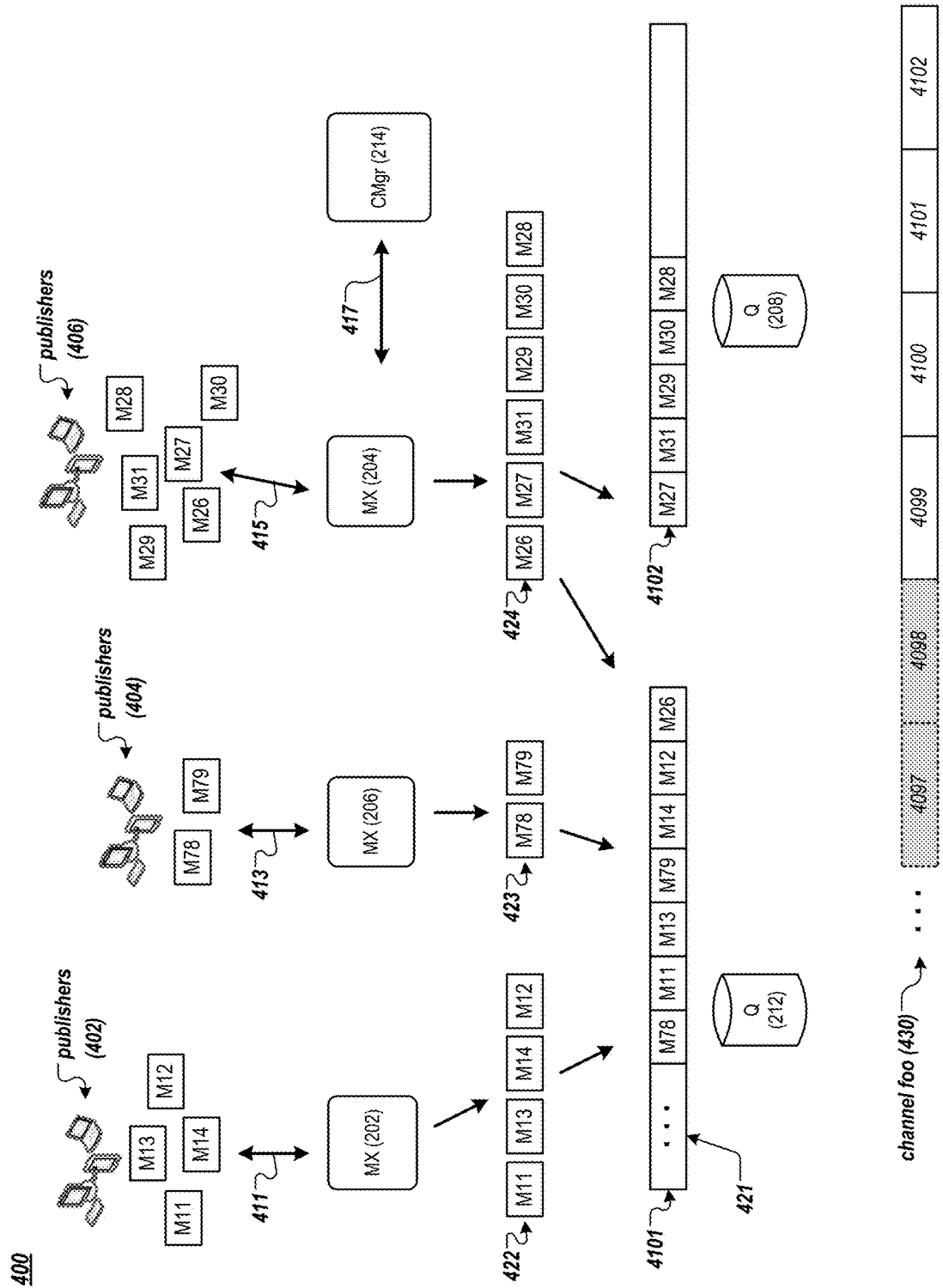
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a configuration manager (e.g., configuration manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the configuration manager 214. If the channel (specified in the subscribe request) does not yet exist in the messaging system 100, the configuration manager can create and maintain a new channel in the messaging system 100. For instance, the configuration manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the configuration manager 214 that allows the MX node to store the messages in a streamlet of the channel foo. For instance, the MX node 202 receives a grant from the configuration manager 214 to write messages M11, M12, M13, and M14 to a streamlet 4101 on the Q node 212. The MX node 206 receives a grant from the configuration manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other appropriate algorithms and techniques, such as Nagle's algorithm, can be used for managing the buffered messages.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the configuration manager 214 to write to the channel foo. The configuration manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the configuration manager 214 for additional messages (e.g., M27, M31, and so on) for the channel foo.

The configuration manager 214 can monitor available Q nodes in the messaging system 100 for their respective workloads (e.g., how many streamlets are residing in each Q node). The configuration manager 214 can allocate a streamlet for the write request from the MX node 204 such that overloading (e.g., too many streamlets or too many read or write grants) can be avoided for any given Q node. For instance, the configuration manager 214 can identify a least loaded Q node in the messaging system 100 and allocate a new streamlet on the least loaded Q node for write requests from the MX node 204. In the example of FIG. 4A, the configuration manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the configuration manager 214 allocates a new streamlet (e.g., streamlet 4102) for a request for a grant from an MX node (e.g., MX node 204) to write to a channel (e.g., foo), the configuration manager 214 assigns to the streamlet its TTL, which will expire after TTLs of other streamlets that are already in the channel's stream. For instance, the configuration manager 214 can assign to each streamlet of the channel foo's channel stream a TTL of 3 minutes when allocating the streamlet. That is, each streamlet will expire 3 minutes after it is allocated (created) by the configuration manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
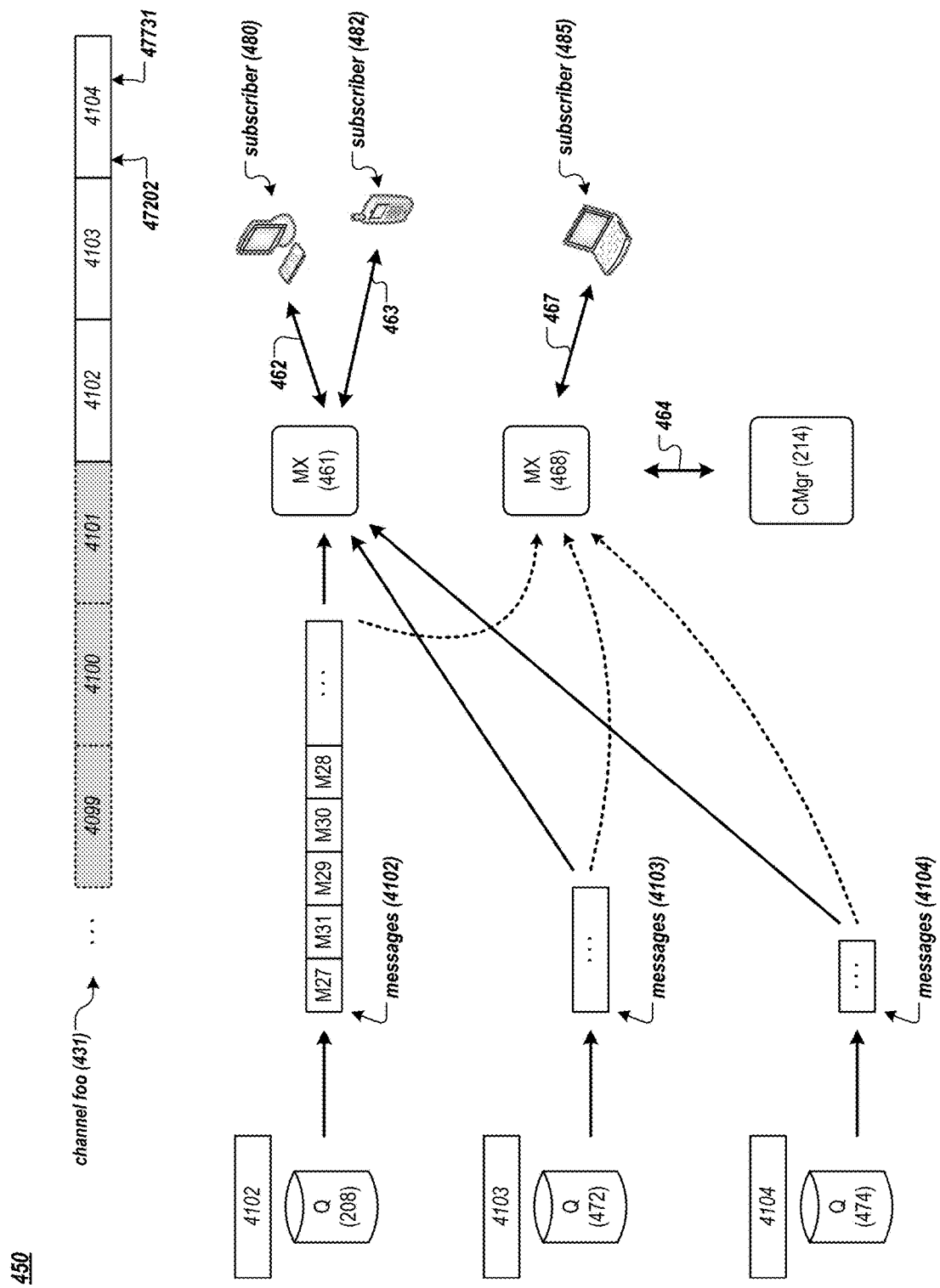
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the configuration manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the configuration manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the configuration manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other appropriate algorithms and techniques, such as Nagle's algorithm, can be used for managing the buffered messages.

After receiving the last message in the streamlet 4102, the MX node 461 can send an acknowledgement to the Q node 208, and send to the configuration manager 214 another request (e.g., for a read grant) for the next streamlet in the channel stream of the channel foo. Based on the request, the configuration manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the configuration manager 214 yet another request for a read grant for messages in the next streamlet 4104 (on Q node 474). After receiving the read grant, the MX node 461 retrieves messages of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q nodes 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective times-to-live that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the configuration manager 214 a request for a read grant for messages starting at the position 47202. Based on the request, the configuration manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The configuration manager 214 maintains the ordered sequence of streamlets as they are created throughout their respective times-to-live. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages (although other sizes of blocks of messages are possible). Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
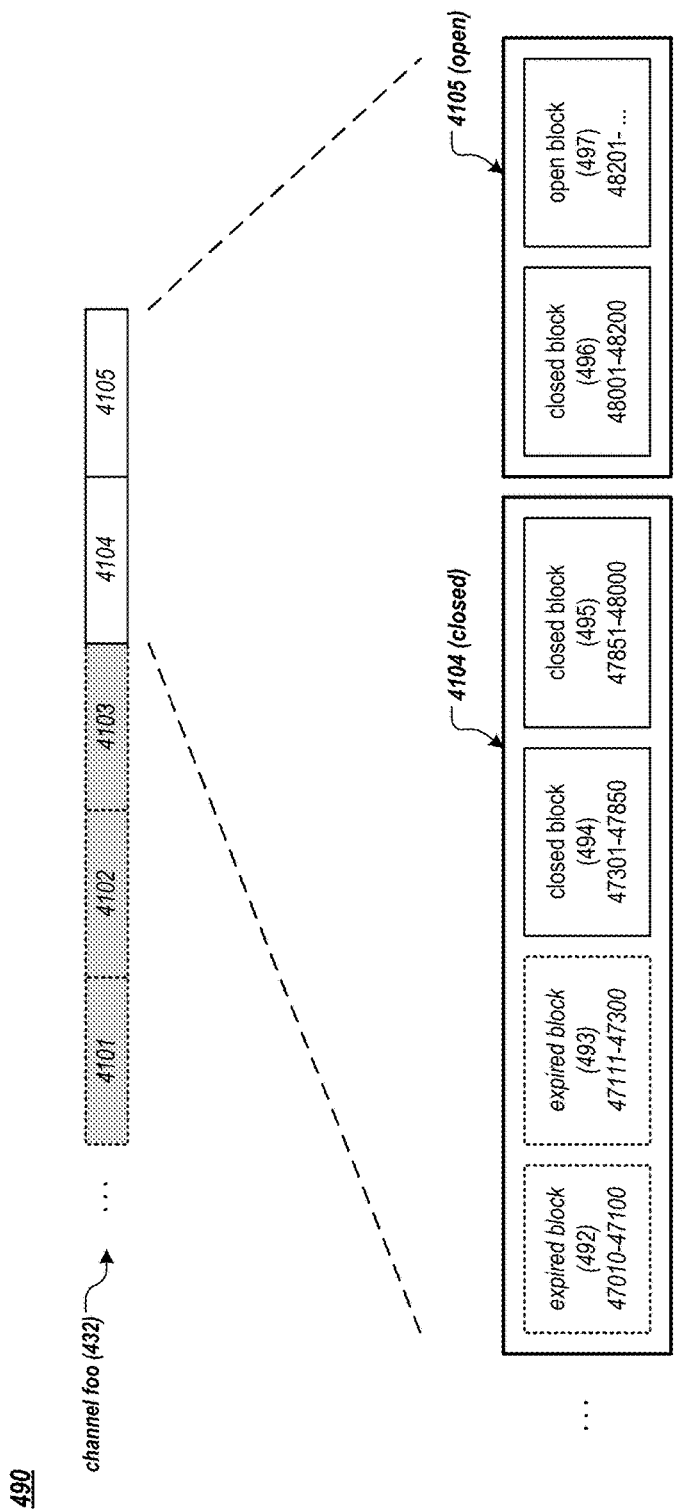
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

As described above, a streamlet (a data buffer) residing on a Q node stores messages of a channel in the messaging system 100. To prevent failure of the Q node (a single point failure) that can cause messages being lost, the messaging system 100 can replicate messages on multiple Q nodes, as described in more detail below.

Figure 5A:
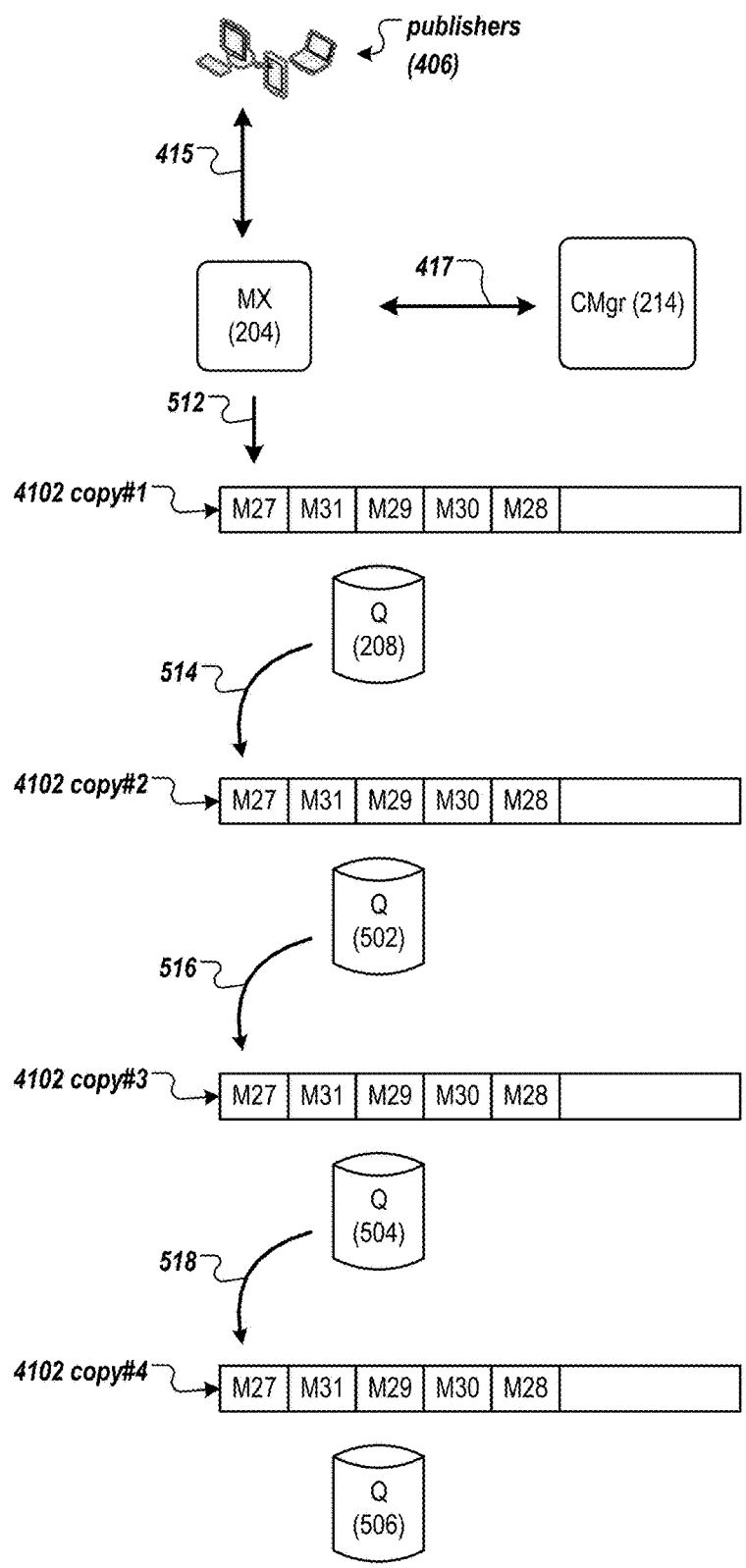
FIG. 5A is a data flow diagram of an example method for publishing and replicating messages of a messaging system.

FIG. 5A is a data flow diagram of an example method 500 for publishing and replicating messages of the messaging system 100. As described earlier in reference to FIG. 4A, the MX node 204 receives messages (of the channel foo) from the publishers 406. The configuration manager 214 can instruct the MX Node 204 (e.g., with a write grant) to store the messages in the streamlet 4102 on the Q node 208. In FIG. 5A, instead of storing the messages on a single node (e.g., Q node 208), the configuration manager 214 allocates multiple Q nodes to store multiple copies of the streamlet 4102 on these Q nodes.

By way of illustration, the configuration manager 214 allocates Q nodes 208, 502, 504, and 506 in the messaging system 100 to store copies of the streamlet 4102. The configuration manager 214 instructs the MX node 204 to transmit the messages for the channel foo (e.g., messages M27, M31, M29, M30, and M28) to the Q node 208 (512). A computing process running on the Q node 208 stores the messages in the first copy (copy #1) of the streamlet 4102. Instead of sending an acknowledgement message to the MX node 204 after storing the messages, the Q node 208 forwards the messages to the Q node 502 (514). A computing process running on the Q node 502 stores the messages in another copy (copy #2) of the streamlet 4102. Meanwhile, the Q node 502 forwards the messages to the Q node 504 (516). A computing process running on the Q node 504 stores the messages in yet another copy (copy #3) of the streamlet 4102. The Q node 504 also forwards the message to the Q node 506 (518). A computing process running on the Q node 506 stores the messages in yet another copy (copy #4) of the streamlet 4102. The Q node 506 can send an acknowledgement message to the MX node 204, indicating that all the messages (M27, M31, M29, M30, and M28) have been stored successfully in streamlet copies #1, #2, #3 and #4.

In some implementations, after successfully storing the last copy (copy #4), the Q node 506 can send an acknowledgement to its upstream Q node (504), which in turns sends an acknowledgement to its upstream Q node (502), and so on, until the acknowledgement is sent to the Q node 208 storing the first copy (copy #1). The Q node 208 can send an acknowledgement message to the MX node 204, indicating that all messages have been stored successfully in the streamlet 4102 (i.e., in the copies #1, #2, #3 and #4).

In this way, four copies of the streamlet 4102 (and each message in the streamlet) are stored in four different Q nodes. Other numbers (e.g., two, three, five, or other suitable number) of copies of a streamlet are also possible. In the present illustration, the four copies form a chain of copies including a head copy in the copy #1 and a tail copy in the copy #4. When a new message is published to the streamlet 4102, the message is first stored in the head copy (copy #1) on the Q node 208. The message is then forwarded downstream to the next adjacent copy, the copy #2 on the Q node 502 for storage, then to the copy #3 on the Q node 504 for storage, until the message is stored in the tail copy the copy #4 on the Q node 506.

In addition to storing and forwarding by messages, the computing processes running on Q nodes that store copies of a streamlet can also store and forward messages by blocks of messages, as described earlier in reference to FIG. 4C. For instance, the computing process storing the copy #1 of the streamlet 4102 on Q node 208 can allocate memory and store a block of, for example, 200 kilobytes of messages (although other sizes of blocks of messages are possible), and forward the block of messages to the next adjacent copy (copy #2) of the chain for storage, and so on, until the block messages is stored in the tail copy (copy #4) on the Q node 506.

Figure 5B:
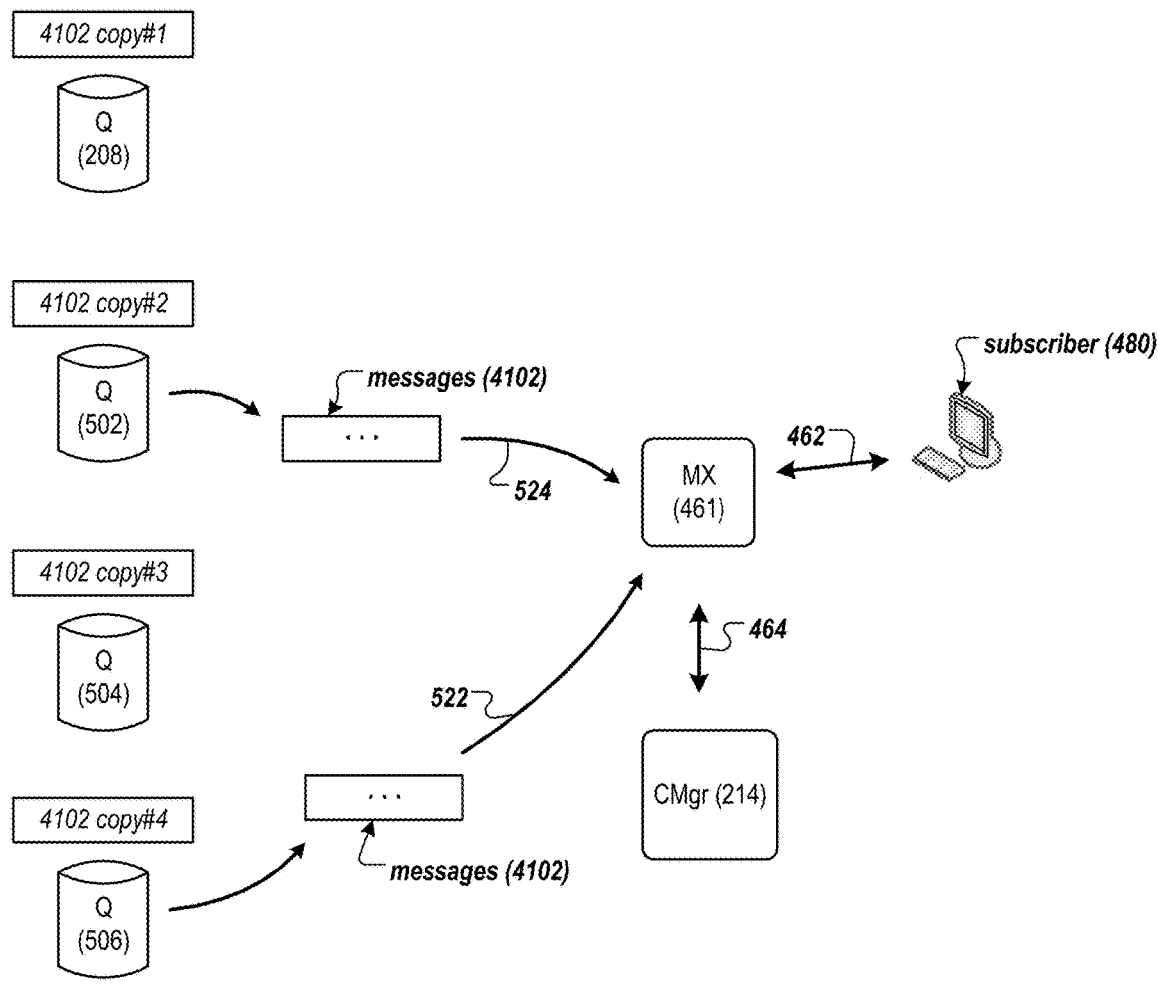
FIG. 5B is a data flow diagram of an example method for retrieving stored messages in a messaging system.

Messages of the streamlet 4102 can be retrieved and delivered to a subscriber of the channel foo from one of the copies of the streamlet 4102. FIG. 5B is a data flow diagram of an example method 550 for retrieving stored messages in the messaging system 100. For instance, the subscriber 480 can send a request for subscribing to messages of the channel to the MX node 461, as described earlier in reference to FIG. 4B. The configuration manager 214 can provide to the MX node 461 a read grant for one of the copies of the streamlet 4102. The MX node 461 can retrieve messages of the streamlet 4102 from one of the Q nodes storing a copy of the streamlet 4102, and provide the retrieved messages to the subscriber 480. For instance, the MX node 461 can retrieve messages from the copy #4 (the tail copy) stored on the Q node 506 (522). As for another example, the MX node 461 can retrieve messages from the copy #2 stored on the Q node 502 (524). In this way, the multiple copies of a streamlet (e.g., copies #1, #2, #3, and #4 of the streamlet 4102) provide replication and redundancy against failure if only one copy of the streamlet were stored in the messaging system 100. In various implementations, the configuration manager 214 can balance workloads among the Q nodes storing copies of the streamlet 4102 by directing the MX node 461 (e.g., with a read grant) to a particular Q node that has, for example, less current read and write grants as compared to other Q nodes storing copies of the streamlet 4102.

A Q node storing a particular copy in a chain of copies of a streamlet may fail, e.g., a computing process on the Q node storing the particular copy may freeze. Other failure modes of a Q node are possible. An MX node can detect a failed node (e.g., from non-responsiveness of the failed node) and report the failed node to a configuration manager in the messaging system 100 (e.g., configuration manager 214). A peer Q node can also detect a failed Q node and report the failed node to the configuration manager. For instance, an upstream Q node may detect a failed downstream Q node when the downstream Q node is non-responsive, e.g., fails to acknowledge a message storage request from the upstream Q node as described earlier. It is noted that failure of a Q node storing a copy of a particular streamlet of a particular channel stream does not have to be for publish or subscribe operations of the particular streamlet or of the particular channel stream. Failure stemming from operations on another streamlet or another channel stream can also alert a configuration manager about failure of a Q node in the messaging system 100.

Figure 5C:
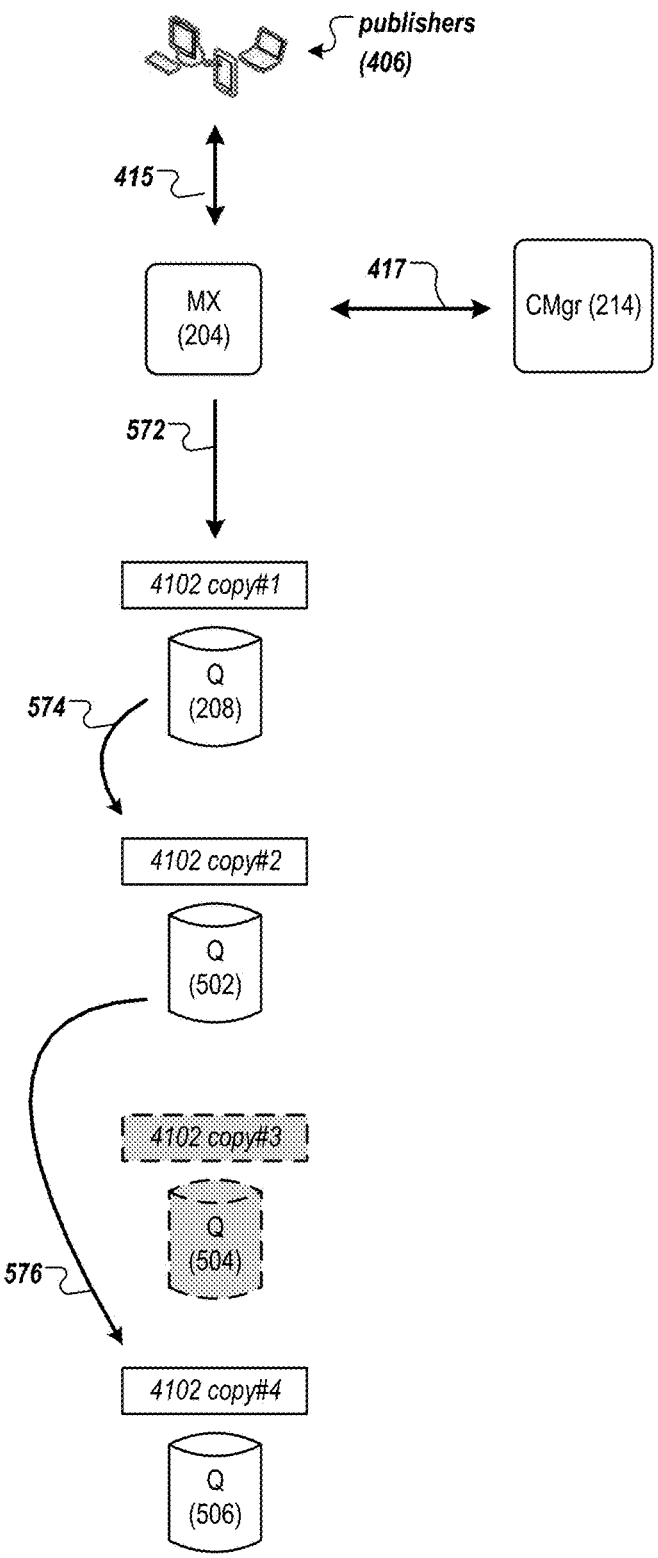
FIGS. 5C and 5D are data flow diagrams of example methods for repairing a chain of copies of data in a messaging system.
Figure 5D:
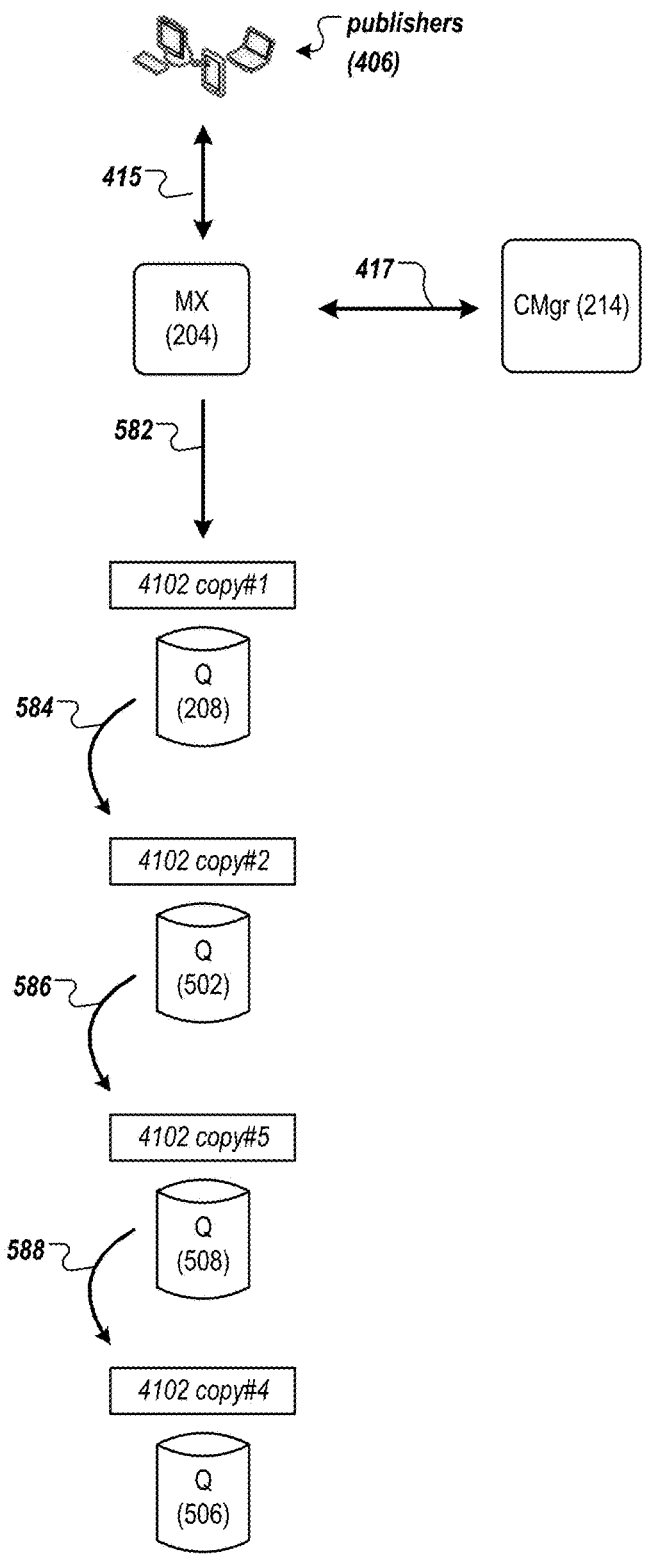

When a Q node storing a particular copy in a chain of copies of a streamlet fails, a configuration manager in the messaging system 100 can repair the chain by removing the failed node, or by inserting a new node for a new copy into the chain, for example. FIGS. 5C and 5D are data flow diagrams of example methods for repairing a chain of copies of a streamlet in the messaging system 100. In FIG. 5C, for instance, after detecting that the Q node 504 fails, the configuration manager 214 can repair the chain of copies by redirecting messages intended to be stored in the copy #3 of the streamlet 4102 on the Q node 502 to the copy #4 of the streamlet 4102 on the Q node 506. In this example, a message (or a block of messages) is first sent from the MX node 204 to the Q node 208 for storage in the copy #1 of the streamlet 4102 (572). The message then is forwarded to the Q node 502 for storage in the copy #2 of the streamlet 4102 (574). The message is then forwarded to the Q node 506 for storage in the copy #4 of the streamlet 4102 (576). The Q node 506 can send an acknowledgement message to the configuration manager 214 indicating that the message has been stored successfully.

Here, a failed node can also be the node storing the head copy or the tail copy of the chain of copies. For instance, if the Q node 208 fails, the configuration manager 214 can instruct the MX node 204 first to send the message to the Q node 502 for storage in the copy #2 of the streamlet 4102. The message is then forwarded to the next adjacent copy in the chain for storage, until the message is stored in the tail copy.

If the Q node 506 fails, the configuration manager 214 can repair the chain of copies of the streamlet 4102 such that the copy #3 on the Q node 504 becomes the tail copy of the chain. A message is first stored in the copy #1 on the Q node 208, then subsequently stored in the copy #2 on the Q node 502, and the copy #3 on the Q node 504. The Q node 504 then can send an acknowledgement message to the configuration manager 214 indicating that the message has been stored successfully.

In FIG. 5D, the configuration manager 214 replaces the failed node Q node 504 by allocating a new Q node 508 to store a copy #5 of the chain of copies of the streamlet 4102. In this example, the configuration manager 214 instructs the MX node 204 to send a message (from the publishers 406) to the Q node 208 for storage in the copy #1 of the streamlet 4102 (582). The message is then forwarded to the Q node 502 for storage in the copy #2 of the streamlet 4102 (584). The message is then forwarded to the Q node 508 for storage in the copy #5 of the streamlet 4012 (586). The message is then forwarded to the Q node 506 for storage in the copy #4 of the streamlet 4102 (588). The Q node 506 can send an acknowledgement message to the configuration manager 214 indicating that the message has been stored successfully.

Figure 6:
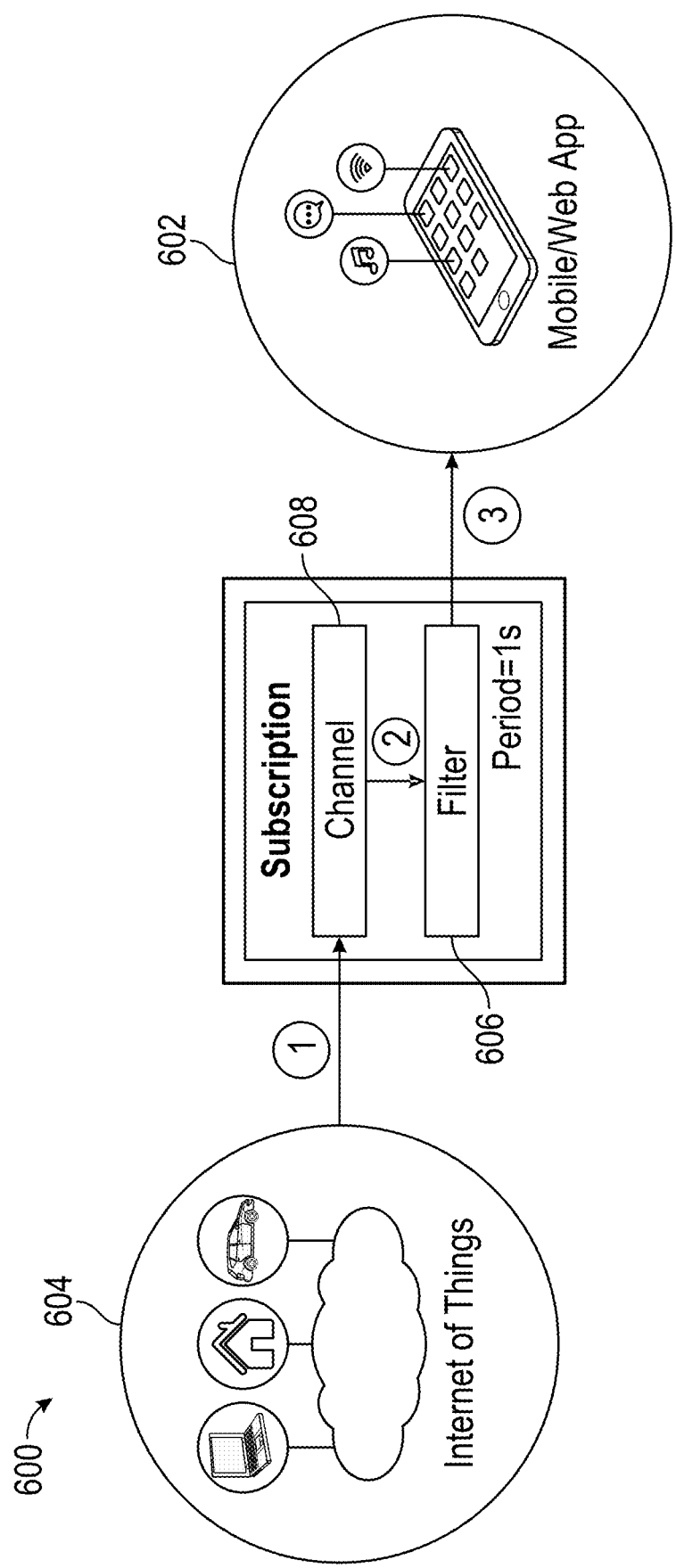
FIG. 6 is an example data flow diagram for the application of filtering criteria in a messaging system.

FIG. 6 is a data flow diagram 600 illustrating the application of selective filtering, searching, transforming, querying, aggregating and transforming of messages in real time to manage the delivery of messages into and through each channel and on to individual subscribers. Users operating applications on client devices, such as, for example, smartphones, tablets, and other internet-connected devices, act as subscribers (e.g., subscriber 480 in FIG. 4B, subscriber 602 in FIG. 6). The applications may be, for example, consumers of the messages to provide real-time information about news, transportation, sports, weather, or other subjects that rely on published messages attributed to one or more subjects and/or channels. Message publishers 604 can be any internet-connected service that provides, for example, status data, transactional data or other information that is made available to the subscribers 602 on a subscription basis. In some versions, the relationship between publishers and channels is 1:1, that is there is one and only one publisher that provides messages into that particular channel. In other instances, the relationship may be many-to-one (more than one publisher provides messages into a channel), one-to-many (a publisher's messages are sent to more than one channel), or many-to-many (more than one publisher provides messages to more than one channel). Typically, when a subscriber subscribes to a channel, they receive all messages and all message data published to the channel as soon as it is published. The result, however, is that many subscribers can receive more data (or data that requires further processing) than is useful. The additional filtering or application of functions against the data places undue processing requirements on the subscriber application and can delay presentation of the data in its preferred format.

A filter 606 can be created by providing suitable query instructions at, for example, the time the subscriber 602 subscribes to the channel 608. The filter 606 that is specified can be applied to all messages published to the channel 608 (e.g., one message at a time), and can be evaluated before the subscriber 602 receives the messages (e.g., see block 2 in FIG. 6). By allowing subscribers 602 to create query instructions a priori, that is upon subscribing to the channel 608 and before data is received into the channel 608, the burden of filtering and processing messages moves closer to the data source, and can be managed at the channel level. As a result, the messages are pre-filtered and/or pre-processed before they are forwarded to the subscriber 602. Again, the query instructions need not be based on any a priori knowledge of the form or substance of the incoming messages. The query instructions can be used to pre-process data for applications such as, for example, real-time monitoring services (for transportation, healthcare, news, sports, weather, etc.) and dashboards (e.g., industrial monitoring applications, financial markets, etc.) to filter data, summarize data and/or detect anomalies. One or more filters 606 can be applied to each channel 608.

The query instructions can implement real-time searches and queries, aggregate or summarize data, or transform data for use by a subscriber application. In some embodiments, including those implementing JSON formatted messages, the messages can be generated, parsed and interpreted using the query instructions, and the lack of a pre-defined schema (unlike conventional RDBMS/SQL-based applications) means that the query instructions can adapt to changing business needs without the need for schema or application layer changes. This allows the query instructions to be applied selectively at the message level within a channel, thus filtering and/or aggregating messages within the channel. In some instances, the queries may be applied at the publisher level—meaning channels that receive messages from more than one publisher may apply certain filters against messages from specific publishers. The query instructions may be applied on a going-forward basis, that is on only newly arriving messages, and/or in some cases, the query instructions may be applied to historical messages already residing in the channel queue.

The query instructions can be applied at either or both of the ingress and egress side of the PubSub service. On the egress side, the query instructions act as a per-connection filter against the message channels, and allows each subscriber to manage their own set of unique filters. On the ingress side, the query instructions operate as a centralized, system-wide filter that is applied to all published messages.

For purposes of illustration and not limitation, examples of query instructions that may be applied during message ingress include:
  A message may be distributed to multiple channels or to a different channel (e.g., based on geo-location in the message, or based on a hash function of some value in the message).
  A message may be dropped due to spam filtering or DoS rules (e.g., limiting the number of messages a publisher can send in a given time period).
  An alert message may be sent to an admin channel on some event arriving at any channel (e.g., cpu_temp>threshold).

For purposes of illustration and not limitation, examples of query instructions that may be applied during message egress include:
  Channels that contain events from various sensors where the user is only interested in a subset of the data sources.
  Simple aggregations, where a system reports real time events, such as cpu usage, sensor temperatures, etc., and we would like to receive some form of aggregation over a short time period, irrespective of the number of devices reporting or the reporting frequency, e.g., average(cpu_load), max(temperature), count(number_of_users), count(number_of_messages) group by country.
  Transforms, where a system reports real time events and metadata is added to them from mostly static external tables, e.g., adding a city name based on IP address, converting an advertisement ID to a marketing campaign ID or to a marketing partner ID.
  Adding default values to event streams where such values do not exist on certain devices.
  Advanced aggregations, where a system reports real time events, and combines some mostly static external tables data into the aggregation in real time, e.g., grouping advertisement clicks by partners and counting number of events.
  Counting number of user events, grouping by a/b test cell allocation.

In some embodiments, the query instructions may be used to define an index or other suitable temporary data structure, which may then be applied against the messages as they are received into the channel to allow for the reuse of the data element(s) as searchable elements. In such cases, a query frequency may be maintained to describe the number of times (general, or in a given period) that a particular data element is referred to or how that element is used. If the frequency that the data element is used in a query exceeds some threshold, the index may be stored for subsequent use on incoming messages, whereas in other instances in which the index is used only once (or infrequently) it may be discarded. In some instances, the query instruction may be applied to messages having arrived at the channel prior to the creation of the index. Thus, the messages are not indexed according to the data elements described in the query instructions but processed using the query instructions regardless, whereas messages arriving after the creation of the index may be filtered and processed using the index. For queries or other subscriptions that span the time at which the index may have been created, the results of applying the query instructions to the messages as they are received and processed with the index may be combined with results of applying the query instructions to non-indexed messages received prior to receipt of the query instructions.

For purposes of illustration and not limitation, one use case for such a filtering application is a mapping application that subscribes to public transportation data feeds, such as the locations of all buses across a city. The published messages may include, for example, geographic data describing the location, status, bus agency, ID number, route number, and route name of the buses. Absent pre-defined query instructions, the client application would receive individual messages for all buses. However, query instructions may be provided that filter out, for example, inactive routes and buses and aggregate, for example, a count of buses by agency. The subscriber application receives the filtered bus data in real time and can create reports, charts and other user-defined presentations of the data. When new data is published to the channel, the reports can be updated in real time based on a period parameter (described in more detail below).

The query instructions can be provided (e.g., at the time the subscriber subscribes to the channel) in any suitable format or syntax. For example, the following illustrates the structure of several fields of a sample subscription request Protocol Data Unit (PDU) with the PDU keys specific to adding a filter to a subscription request:

```
{
    "action": "subscribe",
    "body": {
        "channel": "ChannelName"
        "filter": "QueryInstructions"
        "period": [1-60, OPTIONAL]
    }
}
```

In the above subscription request PDU, the "channel" field can be a value (e.g., string or other appropriate value or designation) for the name of the channel to which the subscriber wants to subscribe. The "filter" field can provide the query instructions or other suitable filter commands, statements, or syntax that define the type of key/values in the channel message to return to the subscriber. The "period" parameter specifies the time period in, for example, seconds, to retain messages before returning them to the subscriber (e.g., an integer value from 1 to 60, with a default of, for example, 1). The "period" parameter will be discussed in more detail below. It is noted that a subscription request PDU can include any other suitable fields, parameters, or values.

One example of a query instruction is a "select" filter, which selects the most recent (or "top") value for all (e.g., "select.*") or selected (e.g., "select.name") data elements. In the example below, the Filter column shows the filter value sent in the query instructions as part of a subscription as the filter field. The Message Data column lists the input of the channel message data and the message data sent to the client as output. In this example, the value for the "extra" key does not appear in the output, as the "select" filter can return only the first level of results and does not return any nested key values.

| Filter | Message Data |
|---|---|
| SELECT * | Input<br>{"name": "art", "eye": "blue"},<br>{"name": "art", "age": 11},<br>{"age": 12, "height": 190}<br>Output<br>{"name": "art", "age": 12, "eye": "blue", "height": 190} |
| SELECT top.* | Input<br>{"top": {"age": 12, "eyes": "blue"}},<br>{"top": {"name": "joy", "height": 168}, "extra": 1},<br>{"top": {"name": "art"}}<br>Output<br>{"name": "art", "age": 12, "eye": "blue", "height": 168} |

For aggregative functions, all messages can be combined that satisfy the query instructions included in the GROUP BY clause. The aggregated values can then be published as a single message to the subscriber(s) at the end of the aggregation period. The number of messages that are aggregated depends on, for example, the number of messages received in the channel in the period value for the filter. For instance, if the period parameter is set to 1, and 100 messages are received in one second, all 100 messages are aggregated into a single message for transmission to the subscriber(s). As an example, a query instruction as shown below includes a filter to aggregate position data for an object, grouping it by obj_id, with a period of 1:

SELECT*WHERE (<expression with aggregate function>) GROUP BY obj_id

In this example, all messages published in the previous second with the same obj_id are grouped and sent as a batch to the subscriber(s).

In some embodiments, a MERGE(*) function can be used to change how aggregated message data is merged. The MERGE(*) function can return a recursive union of incoming messages over a period of time. The merge function may be used, for example, to track location data for an object, and the subscriber is interested in the most recent values for all key/value pairs contained in a set of aggregated messages. The following statement shows an exemplary syntax for the MERGE(*) function:

SELECT [expr] [name,]MERGE(*)[.*] [AS name] [FROM expr] [WHERE expr] [HAVING expr] GROUP BY name The following examples illustrate how the MERGE(*) function may be applied within query instructions to various types of channel messages. In the following examples, the Filter column shows the filter value included in the query instructions as part of a subscription request as the FILTER field. The Message Data column lists the Input channel message data and the resulting message data sent to the subscriber as Output. The filter returns the most recent values of the keys identified in the input messages, with the string MERGE identified as the column name in the output message data. The first example below shows the MERGE(*) function in a filter with a wildcard, for the message data is returned using the keys from the input as column names in the output.

| Filter | Message Data |
|---|---|
| SELECT MERGE(*) | Input<br>{"name": "art", "age": 10},<br>{"name": "art", "age": 11, "items": [0]}<br>Output<br>{"MERGE": {"name": "art", "age": 11, "items": [0]}} |

The next example illustrates the use of the MERGE(*) function in a filter using a wildcard and the "AS" statement with a value of MERGE. The output data includes MERGE as the column name.

| Filter | Message Data |
|---|---|
| SELECT MERGE(*).* | Input<br>{<br>  "name": "art",<br>  "age": 12,<br>  "items": [0],<br>  "skills": {<br>    "work": ["robots"]<br>  }<br>},<br>{<br>  "name": "art",<br>  "age": 13,<br>  "items": ["car"],<br>  "skills": {<br>    "home": ["cooking"]<br>  }<br>}<br>Output<br>{<br>  "name": "art",<br>  "age": 13,<br>  "items": ["car"],<br>  "skills": {<br>    "work": ["robots"],<br>    "home": ["cooking"]<br>  }<br>} |
| SELECT MERGE(top.*) AS merge | Input<br>{"top": { }, "garbage": 0},<br>{"top": {"name": "art", "eyes": "blue"}},<br>{"top": {"name": "joy", "height": 170}}<br>Output<br>{"merge": {"name": "joy", "eyes": "blue", "height": 170}} |

Generally, for aggregative functions and for filters that only include a SELECT(expr) statement, only the latest value for any JSON key in the message data from the last message received can be stored and returned. Therefore, if the most recent message received that satisfies the filter statement is missing a key value identified in a previously processed message, that value is not included in the aggregate, which could result in data loss. However, filters that also include the MERGE(*) function can retain the most recent value for all keys that appear in messages to an unlimited JSON object depth. Accordingly, the most recent version of all key values can be retained in the aggregate.

The MERGE(*) function can be used to ensure that associated values for all keys that appear in any message during the aggregation period also appear in the final aggregated message. For example, a channel may track the physical location of an object in three dimensions: x, y, and z. During an aggregation period of one second, two messages are published to the channel, one having only two parameters: OBJ{x:1, y:2, z:3} and OBJ{x:2, y:3}. In the second message, the z value did not change and was not included in the second message. Without the MERGE(*) function, the output result would be OBJ{x:2, y:3}. Because the z value was not present in the last message in the aggregation period, the z value was not included in the final aggregate. However, with the MERGE(*) function, the result is OBJ{x:2, y:3, z:3}.

The following table shows one set of rules that may be used to aggregate data in messages, depending on the type of data. For arrays, elements need not be merged, but instead JSON values can be overwritten for the array in the aggregate with the last array value received.

| Type of JSON Data | Data to Aggregate {msg1}, {msg2} | Without MERGE(*) | With MERGE(*) |
|---|---|---|---|
| Additional key/value | {a: 1, b: 2}, {c: 3} | {c: 3} | {a: 1, b: 2, c: 3} |
| Different value datatype | {a: 2}, {a: "2"} | {a: "2"} | {a: "2"} |
| Missing key/value | {a: 2}, { } | {a: 2} | {a: 2} |
| null value | {a: 2}, {a: null} | {a: null} | {a: null} |
| Different key value | {a: {b: 1}}, {a: {c: 2}} | {a: {c: 2}} | {a: {b: 1, c: 2}} |
| Arrays | {a: [1, 2]}, {a: [3, 4]} | {a: [3, 4]} | {a: [3, 4]} |

The query instructions can be comprised of one or more suitable filter commands, statements, functions, or syntax. For purposes of illustration and not limitation, in addition to the SELECT and MERGE functions, the query instructions can include filter statements or functions, such as, for example, ABS(expr), AVG(expr), COALESCE(a[, b . . . ]), CONCAT(a[, b . . . ]), COUNT(expr), COUNT_DISTINCT (expr), IFNULL(expr1, expr2), JSON(expr), MIN(expr[, expr1, . . . ]), MAX(expr[, expr1, . . . ]), SUBSTR(expr, expr1 [, expr2]), SUM(expr), MD5(expr), SHA1(expr), FIRST_VALUE(expr) OVER (ORDER BY expr1), and/or LAST_VALUE(expr) OVER (ORDER BY expr1), where "expr" can be any suitable expression that is capable of being processed by a filter statement or function, such as, for example, a SQL or SQL-like expression. Other suitable filter commands, statements, functions, or syntax are possible for the query instructions.

According to the present invention, non-filtered queries can translate to an immediate copy of the message to the subscriber, without any JSON or other like processing. Queries that include a SELECT filter command (without aggregation) can translate into an immediate filter. In instances in which the messages are formatted using JSON, each message may be individually parsed and any WHERE clause may be executed directly on the individual message as it arrives, without the need for creating indices or other temporary data structures. If the messages pass the WHERE clause filter, the SELECT clause results in a filtered message that can be converted back to its original format or structure (e.g., JSON) and sent to the subscriber.

Aggregative functions, such as, for example, COUNT( ), SUM( ), AVG( ), and the like, can translate into an immediate aggregator. In instances in which the messages are formatted using JSON, each message may be individually parsed and any WHERE clause may be executed directly on the individual message as it arrives, without the need for creating indices or other temporary data structures. If a WHERE clause is evaluated, messages passing such criteria are aggregated (e.g., aggregates in the SELECT clause are executed, thereby accumulating COUNT, SUM, AVG, and so forth) using the previous accumulated value and the value from the individual message. Once per aggregation period (e.g., every 1 second), the aggregates are computed (e.g., AVG=SUM/COUNT), and the SELECT clause outputs the aggregated message, which can be converted to its original format or structure (e.g., JSON) and sent to the subscriber.

More complex aggregative functions, such as, for example, GROUP BY, JOIN, HAVING, and the like, can be translated into a hash table aggregator. Unlike SELECT or other like functions that can use a constant memory, linearly expanding memory requirements can be dependent upon the results of the GROUP BY clause. At most, grouping by a unique value (e.g., SSN, etc.) can result in a group for each individual message, but in most cases grouping by a common data element (e.g., user_id or other repeating value) can result in far fewer groups. In practice, each message is parsed (from its JSON format, for example). The WHERE clause can be executed directly on the individual message as it arrives, without creating indices or other temporary structures. If the WHERE clause is satisfied, the GROUP BY expressions can be computed directly and used to build a hash key for the group. The aggregative functions in the SELECT clause can be executed, accumulating COUNT, SUM, AVG, or other functions using the previous accumulated value specific for the hash key (group) and the value from the individual message. Once per aggregation period (e.g., every 1 second), the aggregates are computed (e.g., AVG=SUM/COUNT) for each hash key (group), and the SELECT clause can output the aggregated message for each hash key to be converted back to its original format or structure (e.g., JSON) and sent to the subscriber (e.g., one message per hash key (group)).

In embodiments in which the aggregation period is limited (e.g., 1 second-60 seconds) and the network card or other hardware/throughput speeds may be limited (e.g., 10/gbps), the overall maximal memory consumption can be calculated as time*speed (e.g., 1 GB per second, or 60 GB per minute). Hence, the upper bound is independent of the number of subscribers. In certain implementations, each message only need be parsed once (e.g., if multiple filters are set by multiple clients) and only if needed based on the query instructions, as an empty filter does not require parsing the message.

Figure 7A:
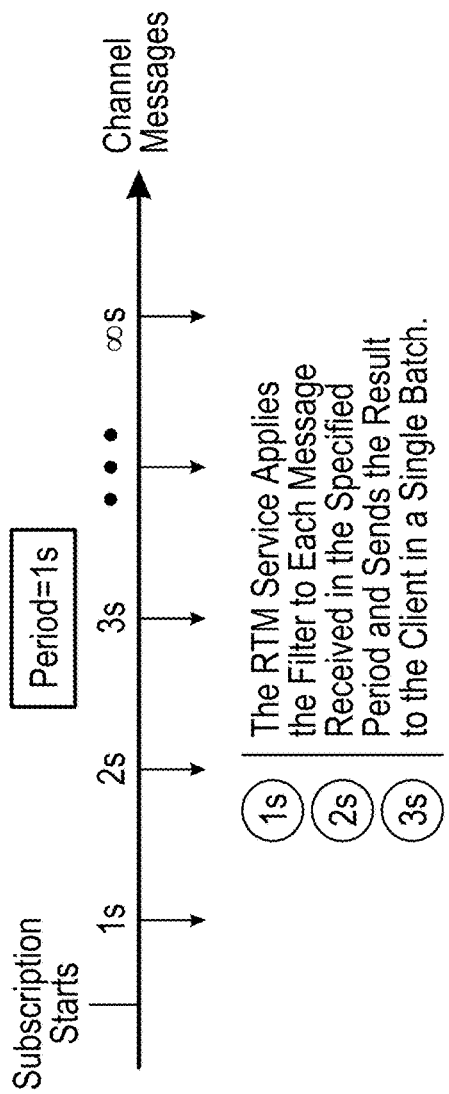
FIGS. 7A-7D are illustrations of how messages may be processed using query instructions that include a period-based parameter.

Referring to FIG. 7A, subscriptions can include a "period" parameter, generally defined in, for example, seconds and in some embodiments can range from 1 to 60 seconds, although other time increments and time ranges are possible. The period parameter(s) can be purely sequential (e.g., ordinal) and/or time-based (e.g., temporal) and included in the self-described data and therefore available for querying, aggregation, and the like. For example, FIG. 7A illustrates the filter process according to the present invention for the first three seconds with a period of 1 second. In the present example, the subscription starts at t=0. The filter created from the query instructions is applied against all messages received during each 1-second period (e.g., one message at a time). The results for each period are then batched and forwarded to the subscriber. Depending on the query instructions used, the messages can be aggregated using the aggregation functions discussed previously before the message data is sent to the subscriber.

In some cases, the process defaults to sending only new, incoming messages that meet the query instructions on to the subscriber. However, a subscriber can subscribe with history and use a filter, such that the first message or messages sent to the subscriber can be the historical messages with the filter applied. Using the period of max_age and/or a "next" parameter provides additional functionality that allows for retrieval and filtering of historical messages.

Figure 7B:
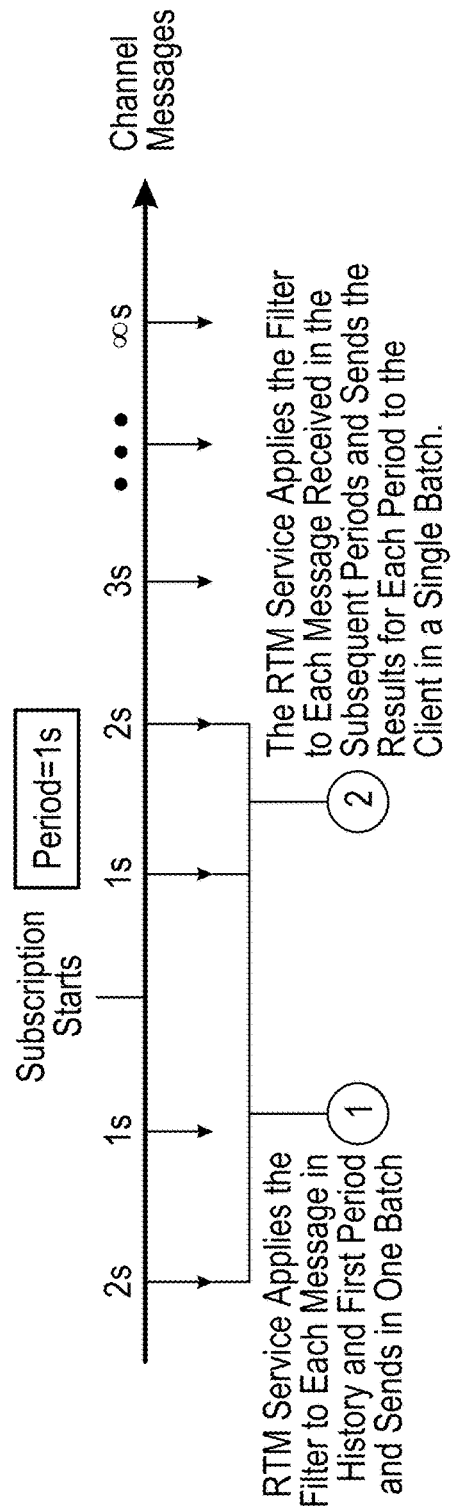

More particularly, a max_age parameter included with the query instructions can facilitate the retrieval of historical messages that meet this parameter. FIG. 7B illustrates an example of a max_age parameter of 2 seconds (with a period of 1 second) that is provided with the query instructions. The filter created from the query instructions is applied to the historical messages from the channel that arrived from t−2 through t=0 (t=0 being the time the subscription starts), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on to the subscriber.

Figure 7C:
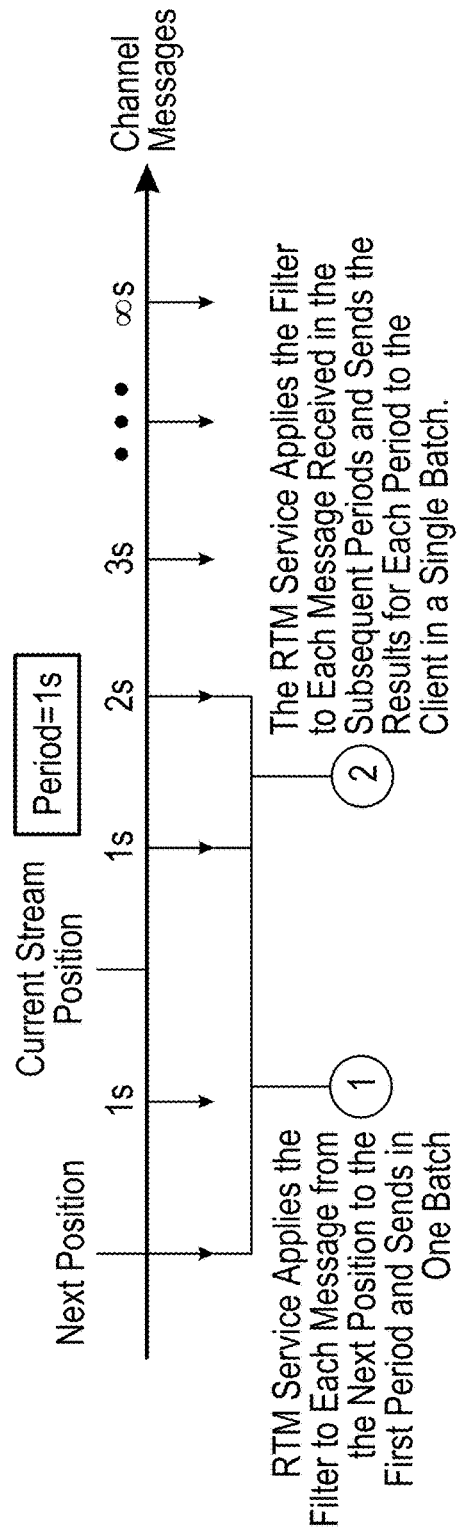

When a subscriber subscribes with a "next" parameter to a channel with a filter, the filter can be applied to all messages from the next value up to the current message stream position for the channel, and the results can be sent to the subscriber in, for example, a single batch. For example, as illustrated in FIG. 7C, a next parameter is included with the query instructions (with a period of 1 second). The next parameter instructs the process to apply the filter created from the query instructions to each message from the "next position" up through the current stream position (e.g., up to t=0) and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber.

Figure 7D:
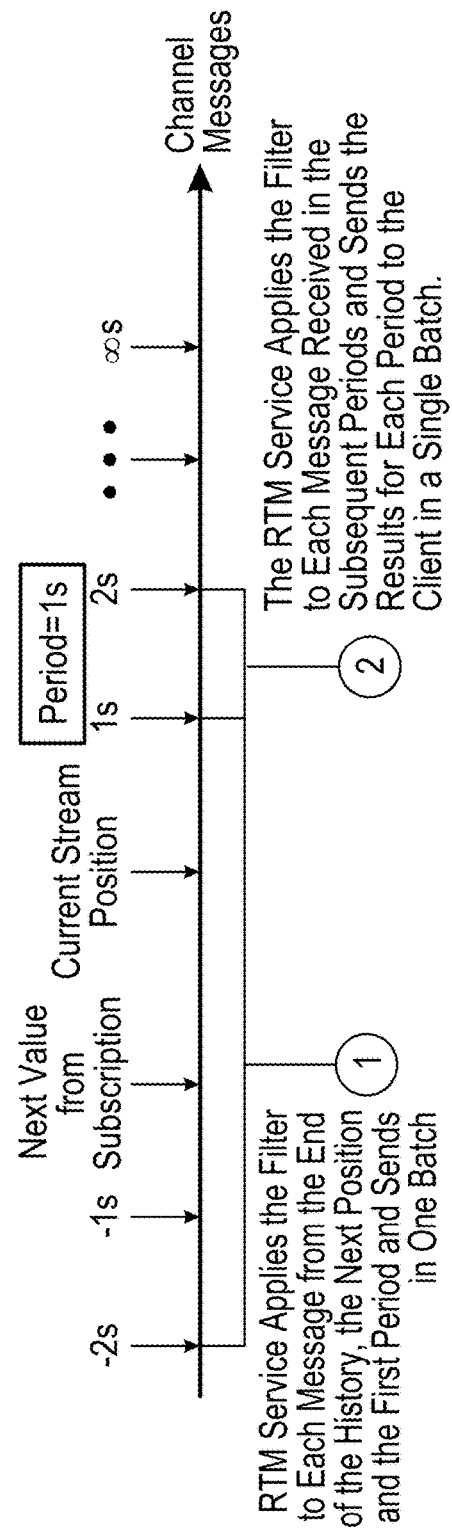

When a subscriber subscribes with a next parameter, chooses to receive historical messages on a channel, and includes a filter in the subscription, the subscriber can be updated to the current message stream position in multiple batches. FIG. 7D illustrates an example of a max_age parameter of 2 seconds (with a period of 1 second) and a next parameter that can be combined into one set of query instructions. The filter created from the query instructions is applied to the historical messages from the channel that arrived from the end of the history to the "next" value of the subscription (i.e., from 2 seconds before the next value up to the next value), to the messages from the next value to the current stream position (e.g., up to t=0), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber. Consequently, historical messages can be combined with messages that start at a particular period indicator and batched for transmission to the subscriber.

The query instructions can define how one or more filters can be applied to the incoming messages in any suitable manner. For example, the resulting filter(s) can be applied to any or all messages arriving in each period, to any or all messages arriving across multiple periods, to any or all messages arriving in select periods, or to any or all messages arriving on a continuous or substantially continuous basis (i.e., without the use of a period parameter such that messages are not retained before returning them to the subscriber). Such filtered messages can be batched in any suitable manner or sent individually (e.g., one message at a time) to subscribers. In particular, the filtered messages can be sent to the subscriber in any suitable format or syntax. For example, the following illustrates the structure of several fields of a sample channel PDU that contains the message results from a filter request:

```
{
    "action": "channel/data",
    "body": {
```

```
        "channel": ChannelName
        "next": ChannelStreamPosition
        "messages": [ChannelData]+      // Can be one or more
        messages
    }
}
```

In the above channel PDU, the "channel" field can be a value (e.g., string or other appropriate value or designation) of the channel name to which the subscriber has subscribed. The "next" field can provide the channel stream position of the batch of messages returned in the channel PDU. The "messages" field provides the channel data of the messages resulting from application of the specified filter. One or more messages can be returned in the "messages" field in such a channel PDU. It is noted that a channel PDU can include any other suitable fields, parameters, values, or data.

Figure 8:
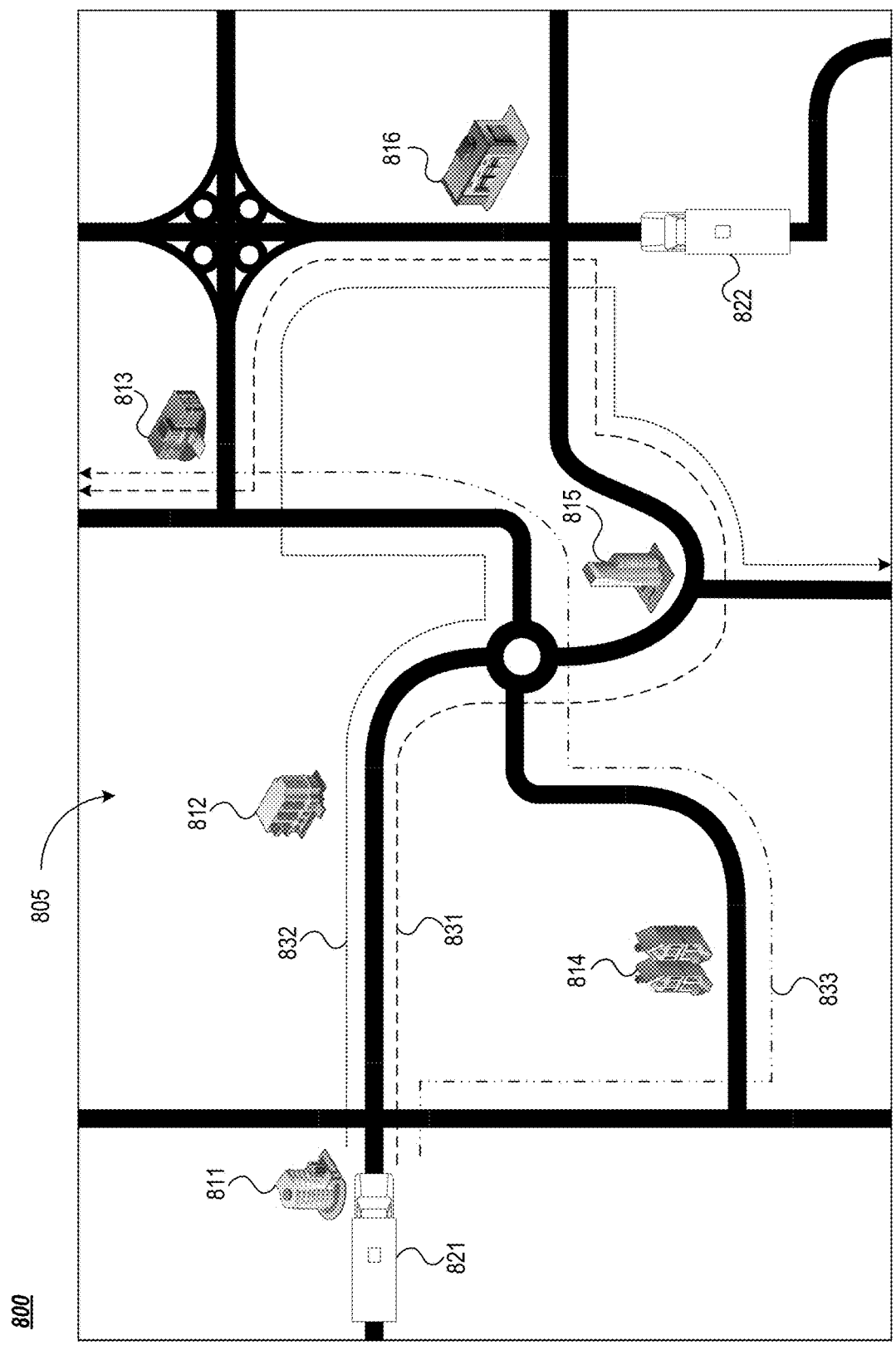
FIG. 8 is a diagram illustrating an example map of a geographical area where one or more vehicles may travel along one or more routes through the geographical area.

FIG. 8 is a diagram illustrating an example map 800 of a geographical area 805 where one or more vehicles may travel along one or more routes through the geographical area 805. The map 800 includes vehicle 821, vehicle 822, geographical location 811, geographical location 812, geographical location 813, geographical location 814, geographical location 815, and geographical location 816. As discussed above, vehicle 821 and vehicle 822 may travel on one or more routes throughout the geographical area 805 (e.g., a neighborhood, a city, a county, a corporate campus, an educational campus, etc.). As illustrated in FIG. 8, the geographical area 805 includes geographical locations 811, 812, 813, 814, 815, and 816. Examples of geographical locations may include, but are not limited to, houses, apartment complexes, schools, buildings, or any other suitable location within a geographical area. One or more of vehicle 821 and vehicle 822 may stop at different geographical locations (e.g., geographical locations 811 through 816) at various points along a route. For example, a delivery truck (e.g., a type of vehicle) may travel along a delivery route to allow the delivery truck (or the driver of the delivery truck) to deliver one or more packages or items to one or more users at one or more geographical locations. The packages or items may be associated with users who may be expecting, awaiting, etc., the delivery of the packages or items. In another example, the vehicles 821 and 822 may be buses, shuttles, vans, etc., that may pick up and drop off passengers at various geographical locations.

Although the present disclosure may refer to trucks, cars, vans, as examples of the vehicles 821 and 822, other types of vehicles may be used in the embodiments, examples, and implementations disclosed here. In one embodiment, a vehicle may refer to any type of land, sea, air, or amphibious vehicle that may travel to different geographical locations. For example, a vehicle may be a boat that may travel on water (e.g., an ocean, a lake, a river, a bay, etc.) to get to a geographical location. In another example, vehicle may be an aerial drone, an airplane, or a glider, that may fly to different geographical locations. In a further example, a vehicle may be an autonomous vehicle (e.g., an autonomous car). In yet another example, a vehicle may be a hovercraft that may travel on both water and land to reach a geographical location. In another example, a vehicle may be a seaplane (e.g., an amphibious aircraft).

In one embodiment, vehicle 821 and vehicle 822 may be coupled to a messaging system, such as messaging system 100 discussed above. For example, the vehicle 821 may include a computing device (such as a smartphone, a tablet computer, a laptop computer, a personal digital assistant (PDA), or other computing device) that may be coupled to the messaging system. This may allow the vehicle 821 to publish messages to one or more channels of the messaging system and to receive messages via one or more channels of the messaging system. Computing devices (e.g., smartphones, tablet computers, laptop computers, desktop computers, etc.) of the users (e.g., users who are expecting packages, users who are tracking or are awaiting the arrival of one or more of the vehicles 821 and 822, etc.) may also be coupled to the messaging system. This may allow the users to transmit and receive messages (e.g., publish and subscribe to messages, respectively) via the messaging system. The messaging system may support the PubSub communication pattern. As discussed above, a publisher may publish messages to named channels by way of the messaging system. Subscriber clients may subscribe to a named channel using the messaging system and may start receiving messages. A message can include any type of information including one or more of the following: text (e.g., alphanumeric text), image content, sound content, multimedia content, video content, binary data, etc. A client can be both a publisher and a subscriber. A client may publish messages to multiple channels and may also subscribe to multiple channels (to receive messages from or via the multiple channels).

In one embodiment, vehicle 821 may travel along route 831 (illustrated by the dashed line) through the geographical area 805. The route 831 may include geographical location 811, geographical location 812, geographical location 816, and geographical location 813. The vehicle 821 may stop along the route 831 at one or more of geographical location 811, geographical location 812, geographical location 816, and geographical location 813. For example, the vehicle 821 may be a delivery truck that is delivering packages or items to one or more of geographical location 811, geographical location 812, geographical location 816, and geographical location 813. In another example, the vehicle may be a shuttle that is picking up and dropping off passengers at one or more of geographical location 811, geographical location 812, geographical location 816, and geographical location 813.

In one embodiment, the vehicle 821 and the vehicle 822 may receive one or more messages (from the messaging system) that may indicate the routes on which the vehicle 821 and the vehicle 822 should travel. For example, the vehicle 821 (e.g., a computing device within or otherwise associated with the vehicle 821) may be subscribed to a channel of the messaging system that provides routes to different vehicles. The vehicle 821 may receive a message from the messaging system indicating that the vehicle 821 should travel along the route 831 through the geographical area 805.

In one embodiment, the vehicle 821 may publish (e.g., transmit) one or more messages to the messaging system (e.g., publish one or more messages to one or more channels of the messaging system) indicating the geographical locations of the vehicle 821 as the vehicle 821 moves through the geographical area 805 (or other geographical areas). For example, the vehicle 821 (e.g., a computing device that includes a Global Positioning System (GPS) receiver) may determine the GPS coordinates of the vehicle 821 (e.g., continually determine the GPS coordinates of the vehicle 821). As the vehicle 821 moves (e.g., drives) along route 831, the computing device may publish messages that include GPS coordinates indicating the current geographical location of the vehicle 821 to the messaging system (e.g., to a channel of the messaging system). In one embodiment, the vehicle 821 (e.g., the computing device within the vehicle 821) may periodically publish messages that indicate the current geographical location of the vehicle 821 (e.g., once every period of time or according to a schedule). For example, the vehicle 821 may publish a message that indicates the current geographical location of the vehicle 821 every fraction of a second, every second, every few seconds, every minute, etc. In another embodiment, the vehicle 821 may publish messages indicating the geographical location of the vehicle when the vehicle 821 is in motion. For example, the vehicle 821 may publish the messages when the vehicle 821 is driving and may not publish messages (e.g., may refrain from publishing messages) when the vehicle 821 is stationary. Although the examples, implementations, and embodiments of the present disclosure may refer to GPS and GPS coordinates, GPS coordinates are merely an example of the type of data that may indicate the geographical location of a vehicle. Other types of data include street addresses, longitude and latitude values, etc. Additionally, other suitable techniques for determining the position of a vehicle are possible (e.g., radio tower multi-lateration/cell phone tower triangulation, and the like).

In one embodiment, the vehicle 821 may publish live messages that indicate the live geographical locations of the vehicle 821. For example, the vehicle 821 may publish messages indicating its geographical location while the vehicle 821 is still within a few feet of the geographical location. In another example, the vehicle 821 may publish messages indicating a geographical location within a second (or a few seconds) after the vehicle was at the geographical location.

In one embodiment, the vehicle 821 may receive one or more messages that indicate an updated route for the vehicle. For example, the vehicle 821 (e.g., a computing device in the vehicle 821) may receive one or more messages via the same channel where the vehicle 821 receives a previous message indicating that the vehicle 821 should travel along the route 831. The one or more messages may indicate that the vehicle should travel along route 832.

In one embodiment, the updated route may be a route where one or more of the geographical locations within the geographical area 805 are prioritized. For example, the vehicle 821 may be traveling along an original or first route 831 which allows the vehicle 821 to stop at geographical locations in the following order: 1) geographical location 811; 2) geographical location 812; 3) geographical location 815; 4) geographical location 816; and 5) geographical location 813. The vehicle 821 may receive one or more messages that indicate that the vehicle 821 should travel along route 832 (e.g., an updated route). Route 832 allows the vehicle 821 to stop at geographical locations in the following order: 1) geographical location 811; 2) geographical location 812; 3) geographical location 813; 4) geographical location 816; and 5) geographical location 815. Route 832 may prioritize geographical location 813 by allowing the vehicle to stop at geographical location 813 at an earlier point in time or earlier along the route 832. In some embodiments, the updated route may also be a route that allows a vehicle to arrive at a geographical location at a requested time (e.g., a requested time of arrival) or within a threshold or window of the requested time. For example, route 832 may allow the vehicle 821 to arrive at geographical location 813 at a requested time or arrival. The prioritization of geographical locations may occur based on requests from users, as discussed in more detail below.

In one embodiment, a user may pay a fee when requesting to prioritize a geographical location. For example, if a geographical location may be prioritized, the user may be charged a fee before an updated route (that prioritizes the geographical location) is sent to a vehicle. After receiving payment from the user, the route may be updated and the updated route (which prioritizes the geographical location requested by the user) may be published to the vehicle.

In one embodiment, the updated route may be a route that does not include one or more geographical locations from a previous route. For example, the vehicle 821 may be traveling along an original or first route 831 which allows the vehicle 821 to stop at geographical locations in the following order: 1) geographical location 811; 2) geographical location 812; 3) geographical location 815; 4) geographical location 816; and 5) geographical location 813. The vehicle 821 may receive one or more messages that indicate that the vehicle 821 should travel along route 833 (e.g., an updated route). Route 833 allows the vehicle 821 to stop at geographical locations in the following order: 1) geographical location 811; 2) geographical location 814; 3) geographical location 813. Route 833 does not include geographical location 815 and geographical location 816 (which were on the route 831). In another embodiment, the updated route may be a route that includes one or more geographical locations that were not in a previous route. For example, vehicle 821 may be traveling along an original or first route 831. The vehicle 821 may receive one or more messages that indicate that the vehicle 821 should travel along route 833 (e.g., an updated route). Route 833 (e.g., the updated route) includes geographical location 814, which was not included in route 831 (e.g., the original or first route). The removal (or addition) of geographical locations in updated routes may occur based on requests from users, as discussed in more detail below.

As discussed above, users who want to track the movements of one or more of the vehicle 821 and the vehicle 822 may subscribe to one or more channels of the messaging system that publish messages that may indicate the live locations of the geographical locations of the vehicles 821 and the vehicle 822. This may allow the users to determine the locations of the vehicle 821 or vehicle 822 (e.g., to determine the live locations of the vehicle 821 and of the vehicle 822) by subscribing to the one or more channels. For example, a user's computing device may present a graphical user interface (GUI) that may display the map 800 to the user. Using the map 800, a user may track or monitor the location of vehicle 821 as the vehicle 821 travels through the geographical area 805. Because the vehicle 821 may continuously or periodically publish messages that indicate the live geographical location of the vehicle 821, users are able to view the locations of the vehicle 821 live as the vehicle 821 moves through the geographical area 805.

In one embodiment, one or more users may publish or otherwise transmit a message that includes a request to prioritize a geographical location in the geographical area 805. For example, a user who lives at geographical location 813 may not be able to remain at the geographical location 813 (e.g., remain at home, etc.) after a certain time. The user may transmit a message to the messaging system that includes a request to prioritize geographical location 813. For purposes of illustration and not limitation, such a message can comprise a request for vehicle 821 to arrive at geographical location 813 earlier, to arrive at geographical location 813 at a desired arrival time or arrival time window, or the like. The message that includes the request to prioritize the geographical location 813 may be transmitted via another channel of the messaging system, as discussed in more detail below.

In one embodiment, the user may receive a message via the messaging system indicating that a geographical location requested by the user has been prioritized. For example, the user may receive a message confirming that the geographical location specified by the user in a request to prioritize the geographical location, has been prioritized in a route for a vehicle traveling through the geographical area 805. In another example, the user may receive a message confirming that a vehicle (e.g., vehicle 821 or vehicle 822) will arrive at a geographical location at a certain time or within a time window, as requested by the user. In another embodiment, the user may receive a message indicating that a geographical location requested by the user has not been prioritized if the geographical location cannot be prioritized.

In one embodiment one or more users may publish or otherwise transmit a message that includes a request to add a geographical location to a route for a vehicle or remove a geographical location from a route. For example, a user may have to move from geographical location 816 to geographical location 814, such as the user going from work to home. The user may transmit/publish a message indicating that the user is no longer at geographical location 816 or indicating that vehicle 821 the vehicle no longer needs to travel to geographical location 816. The message may also indicate that the user is at geographical location 814 and that geographical location 814 should be added to the route of the vehicle 821. The route of the vehicle 821 may be updated based on the message from the user, which can indicate that a geographical location should be added or removed from a route, as discussed above. For example, the vehicle 821 may be travelling along route 831 and may receive updated route 833 based on the message from the user indicating that the user is no longer at geographical location 816 or indicating that the user has moved to geographical location 814.

In one embodiment, the users may receive one or more messages that may indicate estimated arrival times of one or more of the vehicle 821 and vehicle 822 at a geographical location. For example, a user may be expecting a package to be delivered to geographical location 813. The user may receive a message that may indicate an estimated time of arrival when the vehicle 821 will arrive at the geographical location 813. For example, the user may receive a message indicating that the vehicle 821 will arrive at approximately 1:30 PM or other suitable time.

In one embodiment, the estimated time of arrival of a vehicle may change when the vehicle receives an updated route. For example, vehicle 821 may previously have been traveling along route 831 and may receive a message indicating that the vehicle should travel along route 832. The estimated time of arrival for vehicle 821 at geographical location 815 may change because the route of the vehicle 821 has been updated from route 831 to route 832. The user may receive a message indicating an updated estimated time of arrival when the vehicle 821 receives the updated route.

In one embodiment, the users may receive a message when a vehicle is within a threshold distance of a geographical location or will arrive at the geographical location within a threshold period of time. For example, a user who is expecting the vehicle 821 to arrive or deliver a package at geographical location 812 may receive a message when the vehicle 821 is within five hundred meters, half a mile, or other suitable threshold distance of geographical location 812. In another example, the user may receive a message when the vehicle 821 will arrive at the geographical location 812 within the next minute, the next five minutes, or other appropriate threshold period of time.

As discussed above, users and vehicles may use the messaging system by publishing and receiving messages to allow users to track the live locations of vehicles. Also as discussed above, the users and vehicles may also use the messaging system to change the routes of the vehicles, such as to reroute a vehicle, to prioritize different geographical locations, to add or remove a geographical location from a route, or the like. In one embodiment, a vehicle management component (not illustrated in FIG. 8) may receive messages from the vehicles 821 and 822 (e.g., the computing devices in the vehicles 821 and 822) and from the users (e.g., the computing devices of users who are awaiting the arrival of the vehicles 821 and 822), as discussed in more detail below. The vehicle management component may publish messages to one or more of the vehicle 821, vehicle 822, and the users, as discussed in more detail below.

A vehicle (e.g., vehicle 821) may publish or otherwise transmit messages indicating the current geographical location of the vehicle, as discussed above. For example, the messages can be published every five seconds or at any other suitable time interval indicating the current GPS coordinates of the vehicle. In one embodiment, the vehicle management component may receive the messages from one or more vehicles indicating their current geographical locations and may publish (e.g., forward, republish, etc.) the messages or a subset of the messages received from the vehicles to users who want to track or monitor the geographical locations of the vehicles, as discussed in more detail below. In another embodiment, one or more users may be subscribed to the channels where the vehicles publish messages indicating their current geographical locations. This may allow the users to determine the geographical locations of the vehicles without using the vehicle management component to republish or forward the messages from the vehicles.

As discussed above, a user may publish a message indicating that the user wants a geographical location to be prioritized. In one embodiment, the vehicle management component may receive the message and may determine whether the geographical location can be prioritized, as discussed in more detail below. For example, the vehicle management component may determine whether a vehicle can arrive at the geographical location at an earlier time or at a requested time of arrival based on the current geographical location of the vehicle. If the vehicle is too far away from the requested geographical location, the geographical location may not be prioritized. If the geographical location cannot be prioritized, the vehicle management component may publish a message to the user that requested the prioritization indicating that the geographical location cannot be prioritized, as discussed above.

If the geographical location can be prioritized, the vehicle management component may publish a message to the user that requested the prioritization indicating that the geographical location has been prioritized, as discussed above. The vehicle management component may also determine (e.g., calculate, generate, etc.) an updated route for a vehicle that prioritizes the geographical location, as discussed in more detail below. The vehicle management component may publish to the vehicle another message that includes the updated route, which can include such information as, for example, directions, GPS coordinates, street addresses, etc., for the updated route. The updated route may allow the vehicle to arrive at the geographical location that was prioritized at a requested time or within a requested time window.

A user may also publish a message indicating that a geographical location should be added or removed from the route of a vehicle, as discussed above. In one embodiment, the vehicle management component may receive the message and may determine whether the geographical location can be added or removed. For example, the vehicle management component may determine whether a vehicle may be redirected to the geographical location based on the current geographical location of the vehicle, as discussed in more detail below. If a geographical location can be added or removed, the vehicle management component may publish a message to the user that requested the geographical location to be added or removed indicating that the geographical location has been added to or removed from the route of a vehicle, as discussed above.

In one embodiment, the vehicle management component may determine estimated times of arrival at geographical locations for one or more vehicles. The vehicle management component may publish messages to the messaging system to indicate the estimate times of arrival at geographical locations for one or more vehicles. In another embodiment, the vehicle management component may publish a message indicating that a vehicle is within a threshold distance of a geographical location or will arrive at the geographical location within a threshold period of time, as discussed in more detail below.

As discussed above, the messaging system may allow vehicles to publish their geographical locations live and may allow users to view the live geographical locations of the vehicles. This may allow users to more easily and more accurately determine when a vehicle will arrive, such as, for example, when a package will be delivered, when the user will be picked up at a geographical location, etc. This may also allow users to better plan when they should arrive or be at geographical locations. For example, this may allow users to better plan when they should be at home to receive a package, or when they should arrive at a pickup location for a shuttle. In addition, the users may also publish live requests that a route of a vehicle be changed, because the messaging system is capable of publishing live messages to subscribers. For example, if a user has to leave a geographical location due to a family emergency, the user may publish a message indicating that the geographical location be removed from the route a vehicle. This may allow the vehicle management component to publish a live message to the vehicle indicating a new route that does not include the geographical location so that the vehicle will not waste time and fuel traveling to the geographical location.

Figure 9:
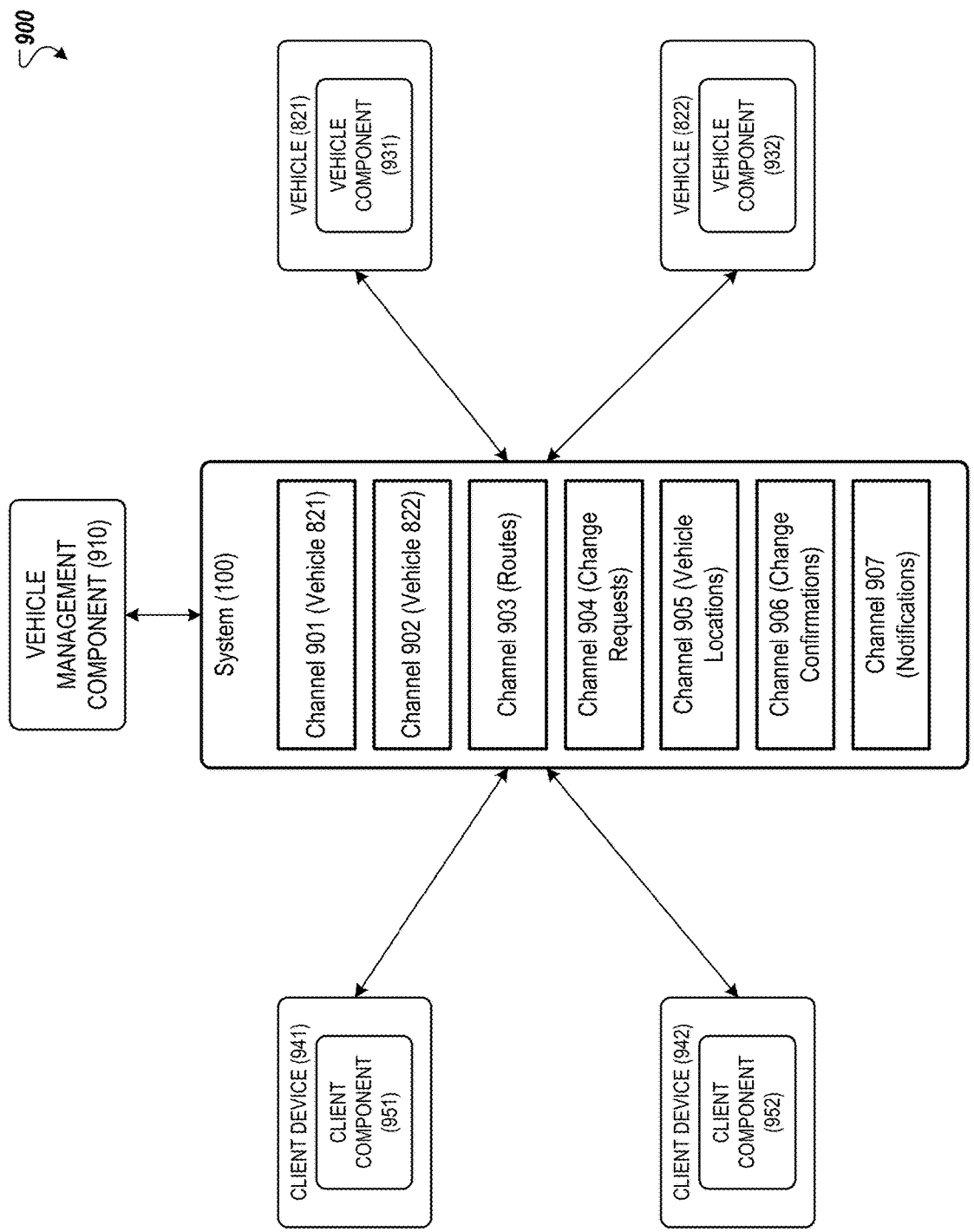
FIG. 9 is a diagram of an example system architecture that may be used to manage and track vehicles traveling in one or more geographical areas.

FIG. 9 is a diagram of an example system architecture 900 that may be used to manage and track vehicles traveling in one or more geographical areas. The system architecture 900 includes messaging system 100, a vehicle management component 910, vehicle 821, vehicle 822, client device 941, and client device 942. The messaging system 100 may support the PubSub communication pattern, as described earlier in reference to FIGS. 1A through 5D. The messaging system 100 may be referred to as a PubSub system or a PubSub messaging system. The messaging system 100 includes channel 901, channel 902, channel 903, channel 904, channel 905, channel 906, and channel 907. The messages published to channels 901 through 907 (e.g., channel streams) may be divided into streamlets which may be stored within Q nodes of the messaging system 100, as described earlier in reference to FIGS. 1A through 5D. C nodes of the messaging system may be used to offload data transfers from one or more Q nodes (e.g., to cache some of the streamlets stored in the Q nodes). Client device 941, 941, vehicle 821, and vehicle 822 may establish respective persistent connections (e.g., TCP connections) to one or more MX nodes. The one or more MX nodes may serve as termination points for these connections, as described earlier in reference to FIGS. 1A through 5D. A configuration manager (illustrated in FIG. 2) may allow users (e.g., client components 951 and 952) and vehicles (e.g., vehicle components 931 and 932) to subscribe to channels and to publish to channels. For example, the configuration manager may authenticate users to determine whether users are allowed to publish to a channel. In another example, the configuration manager may authenticate vehicles to determine whether vehicles are allowed to subscribe to a channel.

In one embodiment, the vehicle management component 910 may include one or more computing devices (e.g., one or more server computers) or may include software components executing on the one or more computing devices. For example, the vehicle management component 910 may be an application that is executing on or distributed among one or more server computers. In another embodiment, the vehicle components 931 and 932 may include computing devices (e.g., smartphones, tablet or laptop computers, PDAs, etc.) or may include software components executing on the one or more computing devices located in the vehicles 821 and 822, respectively. For example, the vehicle components 931 and 932 may be smartphones or may be applications executing on a smartphone. In a further embodiment, the client components 951 and 952 may include software components executing on the client devices 941 (e.g., computing devices such as smartphones, tablet computers, laptop computers, desktop computers, PDAs, etc.). For example, the client components 951 and 952 may be applications that are executing on the users' smartphones.

In one embodiment, vehicle management component 910 may be subscribed to channels 901, 902, and 904 (e.g., may be a subscriber to channels 901, 902, and 904). The vehicle management component 910 may publish messages to channels 903, 905, 906, and 907 (e.g., may be a publisher for channels 903, 905, 906, and 907). In another embodiment, the vehicle components 931 and 932 may subscribe to channel 903. The vehicle components 931 and 932 may also publish messages to channels 901 and 902, respectively. In a further embodiment, the client components 951 and 952 may be subscribed to channels 905, 906, and 907. The client components 951 and 952 may also publish messages to channel 904. However, any vehicle, client device, or component illustrated in FIG. 9 may publish to and/or subscribe to any one or more of channels 901-907.

As discussed above in reference to FIG. 8, vehicles 821 and 822 may move or travel through a geographical area (e.g., through a neighborhood, a city, etc.). For example, the vehicles 821 and 822 may be delivery trucks or vans that are delivering packages to geographical locations (e.g., buildings, houses, etc.), as discussed above. In another example, the vehicles 821 and 822 may be shuttles, busses, or vans that are transporting passengers to different geographical locations, as discussed above. Vehicles 821 and 822 include vehicles components 931 and 932, respectively. The vehicle components 931 and 932 may each be computing devices (e.g., smartphones, table computers, laptop computers, etc.) or software components that allow the vehicles 821 and 822 to publish messages to channels of the messaging system 100 and receive messages from channels of the messaging system 100. The vehicle components 931 and 932 may also determine the geographical locations of the vehicles 821 and 822. For example, the vehicle components 931 and 932 may each include GPS receivers or other suitable devices capable of determining the live location of vehicles 821 and 822, respectively. In one embodiment, the vehicle components 931 and 932 may publish messages indicating the current geographical locations of vehicles 821 and 822 to channels 901 and 902 respectively. For example, the vehicle component 931 may publish a message every second or other appropriate time period that indicates the current GPS coordinates, current address, current longitude and latitude, etc. of the vehicle 821. The message may include an identifier for the vehicle 821 (e.g., an alphanumeric value, a name, an identification number, etc.) and data (e.g., GPS coordinates) to indicate the location of the vehicle 821. The vehicle management component 910 may be subscribed to the channels 901 and 902, which may allow the vehicle management component 910 to receive messages indicating the current geographical locations of the vehicles 821 and 822.

In one embodiment, the vehicle management component 910 may forward or republish some (or all) of the messages received on channels 901 and 902 to channel 905. This may allow the users (e.g., client devices 941 and 942, client components 951 and 952) to receive messages indicating the live locations of the vehicles 821 and 822. This may also allow the vehicle management component 910 to selectively publish a subset of the messages received on channels 901 and 902 to channel 905. For example, the vehicle management component 910 may filter out messages (as described earlier in reference to FIGS. 6-7D) from vehicle 822 because vehicle 822 is not delivering packages or picking up passengers. In another example, the vehicle 821 may publish a message every second or other suitable time period, and the vehicle management component 910 may publish every other message published by the vehicle 821 to channel 901 to reduce the amount of messages that are published in channel 905. In another embodiment, the users may be subscribed channels 901 and 902. This may allow the users to directly receive the messages that indicate the locations of the vehicles 821 and 822, which are published on channels 901 and 902.

The vehicle components 931 and 932 may also perform other functions or operations based on what the vehicles 821 and 822 are doing. For example, if vehicle 821 is delivering packages to different geographical locations, the vehicle component 931 may include a radio-frequency identification (RFID) scanner or reader that allows the vehicle component 931 to track or inventory packages that are on the vehicle 821. When a package is loaded onto the vehicle 821, the vehicle component 931 (e.g., the RFID scanner or reader) may scan an RFID tag or label on the package. The vehicle component 931 may also include a bar code scanner or reader to scan barcodes or quick response (QR) codes on the package. The vehicle component 931 may also publish a message to the channel 901 indicating that the package is on the vehicle 821. The message may include an identifier for the package (e.g., a tracking number, a serial number, an alphanumeric value) and an identifier for the vehicle 821. This may allow the vehicle management component 910 to be aware of which packages are on which vehicles. The message may also include a destination (e.g., a destination geographical location, an address, etc.) for the package. This may allow the vehicle management component 910 to determine where the package is to be delivered.

As discussed above, vehicles 821 and 822 (e.g., the vehicle components 931 and 932) may receive messages from the vehicle management component 910 indicating the routes or updated routes for the vehicles 821 and 822. The vehicle components 931 and 932 may present a map (similar to the map 800 illustrated in FIG. 8) via a GUI that may allow drivers of the vehicles 821 and 822 to see the routes and updated routes. In one embodiment, the vehicle components 931 and 932 may subscribe to the channel 903 to receive the message indicating the routes. Channel 903 may be a channel where the vehicle management component 910 publishes messages that indicate routes or updated routes for the vehicles 821 and 822. The vehicle management component 910 may be aware of which packages are on vehicle 821 based on messages published by vehicle component 931 when the packages were scanned, as discussed above. The vehicle management component 910 may access a database or other system that indicates the geographical locations (e.g., houses, buildings, etc.) for the packages and may generate a route (e.g., route 831 illustrated in FIG. 8) for the vehicle 821. The vehicle management component 910 may publish one or more messages to channel 903 that indicate the route for vehicle 921. One having ordinary skill in the art understands that the vehicle management component 910 may use various route determination algorithms, functions, operations, etc., to generate the route. For example, the vehicle management component 910 may use Dijkstra's algorithm, path finding algorithms, weighted path finding algorithms, etc., to generate the route.

Also as discussed above, a user may request that a geographical location be prioritized, may request that a geographical location be added to a vehicle's route, or may request that a geographical location be removed from a vehicle's route. A request to prioritize, add, or remove a geographical location for a route may be referred to as a request to change a route or update a route. In one embodiment, the users (using the client components 951 and 952) may publish requests to change routes to the channel 904. For example, referring to FIG. 8, a user may publish a message requesting that geographical location 814 be added to the route of the vehicle 821. The message may include an identifier (e.g., a user name, an electronic mail (email) address, an alphanumeric value, an identification number, a phone number, a value that may be used to identifier the user, etc.) for the user that is requesting to add the geographical location 814. The vehicle management component 910 may subscribe to the channel 904 to receive these requests to change routes from the users. The vehicle management component 910 may determine whether the route may be changed to prioritize, add, or remove the requested geographical location. One having ordinary skill in the art understands that the vehicle management component 910 may use various route determination algorithms, functions, operations, to determine whether the route may be changed. For example, the vehicle management component 910 may use Dijkstra's algorithm (which uses a graph with nodes and weighted edges between the nodes) by adding nodes, removing nodes, changing weights of edges, etc.

In one embodiment, the vehicle management component 910 may publish messages to channel 906 indicating whether a request to change a route was performed or approved. For example, the vehicle management component 910 may publish a message indicating that a geographical location could not be added to a route for a vehicle. In another example, the vehicle management component 910 may publish a message indicating that a geographical location requested by a user has been prioritized. The message may include an identifier for the user that requested the change to the route. For example, the message may include the same identifier that was included in the users request to change the route. The user (e.g., client component 951 or client component 952) may receive the message (published on the channel 906) and may determine that the message is directed (e.g., addressed) to the user based on the identifier in the message. The client component 951 or client component 952 may present a message (via a GUI) to the user indicating whether the route was successfully changed.

As discussed above, the vehicle management component 910 may publish messages indicating an estimated time of arrival for a vehicle at a geographical location (e.g., 1:43 PM), may publish messages indicating that a vehicle is within a threshold distance of a geographical location (e.g., within two hundred meters), or may publish messages indicating that the vehicle will arrive at a geographical location within a period of time (e.g., within the next five minutes). These messages may be published via channel 907. Each message may include the time (e.g., within five minutes) or distance (e.g., within two hundred meters), and an identifier for a user, based on the geographical location. For example, referring to FIG. 8, the vehicle management component 910 may determine that a first user is expecting a package to be delivered to geographical location 811. Based on the current geographical location of vehicle 821 (which may be determined based on the messages published by the vehicle 821 to channel 901 as discussed above), the vehicle management component 910 may determine an estimated time of arrival for the vehicle 821 at geographical location 811 and may publish a message that includes the estimated time of arrival and an identifier for the first user. The identifier for the first user may allow the client component of the first user's computing device to determine that the message (with the estimated time of arrival) is relevant to the first user (e.g., is addressed to the first user).

Although the vehicle management component 910 is illustrated as separate from the messaging system 100 in FIG. 9, the vehicle management component 910 may be included as part of the messaging system 100 in other embodiments. For example, the vehicle management component 910 may be part of one or more Q nodes or may be part of the configuration manager. In some embodiments, portions of or the entire vehicle management component 910 may be located within vehicle 821 or vehicles 822. For example, the vehicle 821 itself may receive requests to change a route and may determine the updated route for the vehicle 821. In further embodiments, the vehicle management component 910 may be located within a datacenter or a cloud computing system or architecture.

It shall be understood that the configuration of the channels 901 through 907 (e.g., the number of channels, and the publisher or subscribers of the channels 901 through 907) illustrated in FIG. 9 are merely examples and other configurations may be used in other embodiments. For example, channels 901 and 902 may be combined into a single channel and the messages may be filtered by the vehicle management component 910 based on, for instance, the vehicle identifier. In another example, each user may have a separate channel for receiving route change confirmations and notifications. In a further example, each user may have a separate channel for requesting route changes. In yet another example, each vehicle may have a separate channel for receiving routes and route updates for the vehicle.

Figure 10:
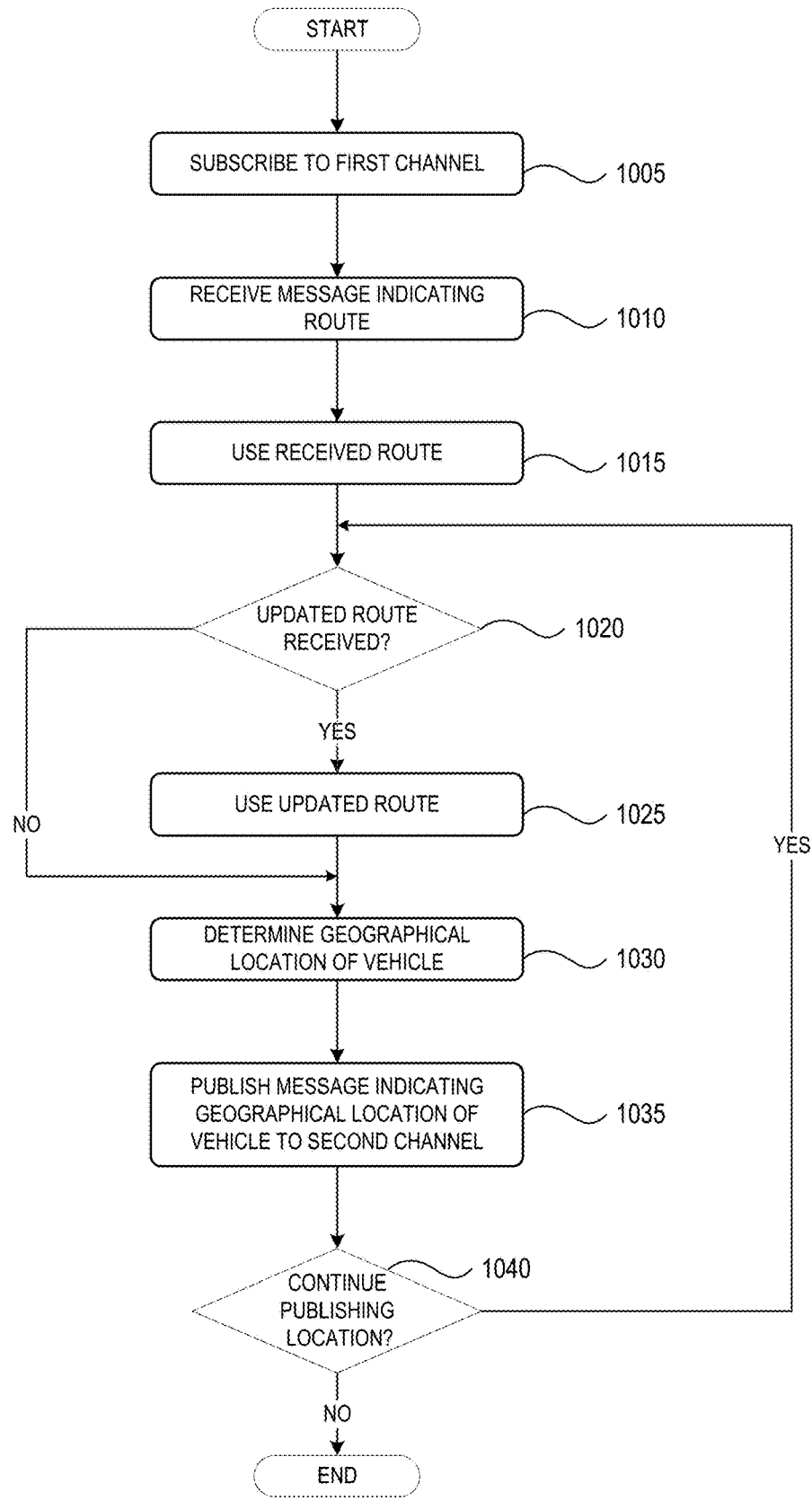
FIG. 10 is a flowchart of an example method for publish and receiving messages in a messaging system.

FIG. 10 is a flowchart of an example method 1000 for publishing and receiving messages in a messaging system. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using, for example, a computing device, a vehicle component (e.g., vehicle components 931 and 932 illustrated in FIG. 9), an application, software components, etc. The method 1000 begins by subscribing to a first channel of a plurality of channels in a messaging system (block 1005). For example, referring to FIG. 9, the method 1000 may subscribe to channel 903. The method 1000 may receive a message indicating a route via the first channel (block 1010). For example, referring to FIG. 9, the method 1000 may receive a message indicating route 831, from a vehicle management component (discussed above in reference to FIGS. 8 and 9) via channel 903. The method 1000 may use the updated route received in the message. For example, the method 1000 may display a map (e.g., map 800 illustrated in FIG. 8) to the user via a GUI indicating the route on the map.

The method 1000 may determine whether an updated route has been received via the first channel (block 1020). For example, the method 1000 may determine whether a second message indicating an updated route was received from the vehicle management component. As discussed above, an updated route may be a route that adds a geographical location, removes a geographical location, or prioritizes a geographical location. If an updated route was received, the method 1000 may use the updated route (block 1025). For example, the method 1000 may display a map (e.g., map 800 illustrated in FIG. 8) to the user via a GUI indicating the updated route on the map. Whether or not an updated route has been received, the method 1000 may determine the current geographical location of the vehicle (block 1030). For example, the method 1000 may use a GPS receiver to determine the current GPS coordinates of the vehicle. The method 1000 may publish a message indicating the current geographical location of the vehicle to a second channel of plurality of channels of the messaging system (block 1035). For example, referring to FIG. 9, the method 1000 may publish a message to channel 901 indicating the geographical location of the vehicle.

The method 1000 may determine whether to continue publishing the geographical location of the vehicle (block 1040). For example, if the vehicle is still delivering packages or is still picking up and dropping off passengers, the method 1000 may determine that the method 1000 should continue publishing the geographical locations of the vehicle and may proceed back to block 1020. The method 1000 may proceed to block 1030 (rather the block 1020) in other embodiments. The method 1000 may periodically perform blocks 1030, 1035, and 1040, as discussed above. For example, the method 1000 may perform blocks 1030, 1035, and 1040 every second, every five seconds, etc. This may allow the method 1000 to publish the live geographical location of the vehicle.

Figure 11:
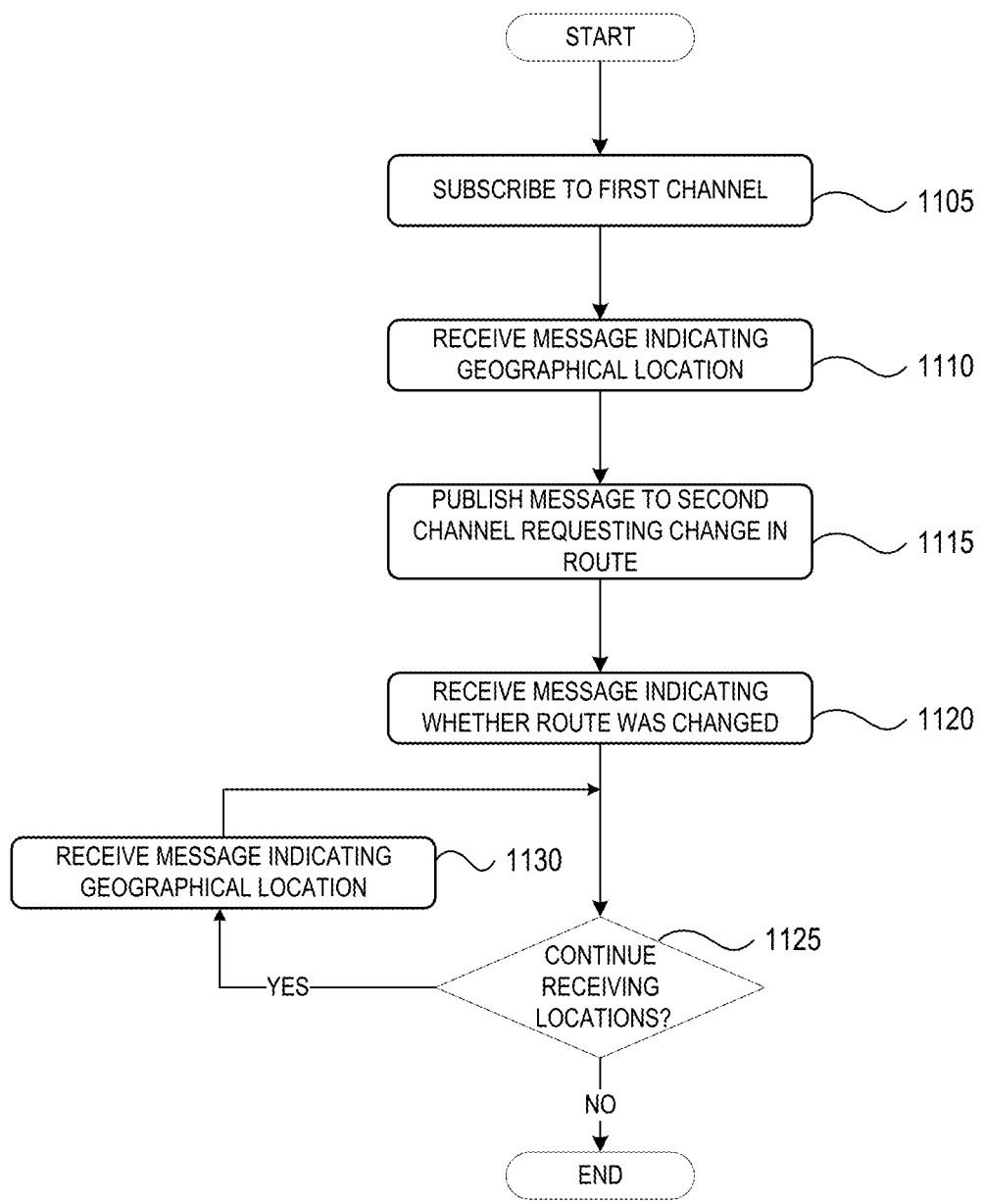
FIG. 11 is a flowchart of an example method for publish and receiving messages in a messaging system.

FIG. 11 is a flowchart of an example method 1100 for publishing and receiving messages in a messaging system. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1100 can be implemented using, for example, a client device (e.g., a computing device such as a smartphone, a tablet or laptop computer, etc.), a client component (e.g., client components 951 and 952 illustrated in FIG. 9), an application, software components, etc. The method 1100 begins by subscribing to a first channel of a plurality of channels in a messaging system (block 1105). For example, referring to FIG. 9, the method 1100 may subscribe to channel 905.

The method may receive a message indicating the current geographical location of a vehicle (block 1110). For example, the method 1100 may receive a message indicating the current geographical location of a vehicle that is carrying a package for a user or that will pick up or drop off a user. The method 1100 may publish a message to a second channel of the plurality of channels (block 1115). For example, referring to FIG. 9, the method 1100 may publish a message to channel 904. The message may indicate that the user wants to prioritize a geographical location, wants to add a geographical location to a route, or wants to remove a geographical location from a route, as discussed above. The method 1100 may receive a message via a third channel of the plurality of channels (at block 1120) indicating whether the route was changed (e.g., whether the geographical location was prioritized, whether a geographical location was added or removed, etc.), as discussed above. The method 1100 may determine whether to continue receiving geographical locations via the first channel (block 1125). For example, the method 1100 may determine whether the user is still viewing or looking at a map that indicates the current geographical location of the vehicle. If the method 1100 determines that the method 1100 should continue receiving geographical locations, the method 1100 may receive a message indicating the current geographical location (e.g., a new or updated geographical location) of the vehicle (block 1130).

Figure 12:
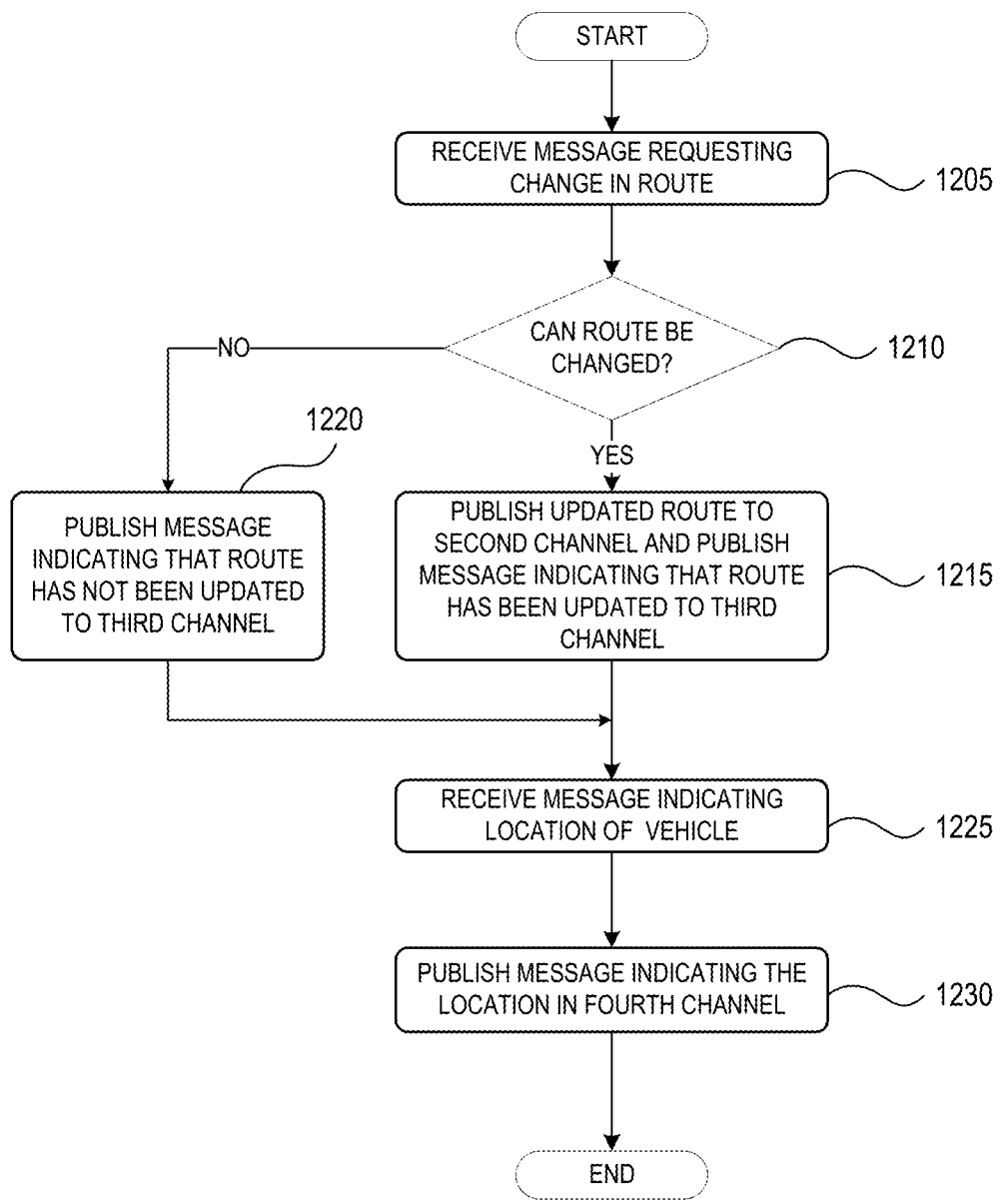
FIG. 12 is a flowchart of an example method for publish and receiving messages in a messaging system.

FIG. 12 is a flowchart of an example method 1200 for publishing and receiving messages in a messaging system. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method can be implemented using an MX node (e.g., MX node 204, MX node 461) and a Q node (e.g., Q node 212, Q node 208) of the messaging system 100, a vehicle management component (illustrated in FIG. 9), one or more computing devices, an application, software components, etc. The method 1200 begins by receiving a message requesting a change in a route (block 1205), as discussed above. For example, referring to FIG. 9, the method 1200 may receive a message via channel 904 from client component 951 indicating that a geographical location along a route of vehicle 821 should be prioritized. In another example, the method 1200 may receive a message indicating that a geographical location should be added or removed from a route. The method 1200 may determine whether the route can be changed (block 1210). For example, the method 1200 may determine whether a geographical location can be prioritized, whether a geographical location can be added, or whether or geographical location can be removed, as discussed above.

If the route can be changed, the method 1200 may publish a message with the updated route to a second channel and may publish a message indicating that the route has been updated to a third channel (block 1215). For example, referring to FIG. 9, the method 1200 may publish a message to channel 903 with the updated route and may publish a message to channel 906 to confirm that the route was updated to the user that requested the change in the route. If the route cannot be changed, the method 1200 may publish a message indicating that the route has not been updated to a third channel (block 1220). For example, referring to FIG. 9, the method 1200 may publish a message to channel 906 to indicate to the user that requested the change in the route that the route was not updated. The method 1200 may receive a message indicating the current geographical location of the vehicle at block 1225. For example, referring to FIG. 9, the method 1200 may receive a message from vehicle 821 via channel 901. The method 1200 may publish the message (e.g., forward or republish the message) indicating the current geographical location of the vehicle in a fourth channel (block 1230). For example, referring to FIG. 9, the method 1200 may publish a message indicating the geographical location of the vehicle to channel 905.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application-specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving a first message on a first logical channel of a plurality of logical channels, wherein the first logical channel is associated with a vehicle that is traveling on a route and wherein the first message comprises a request to prioritize a first geographical location of the route;
   determining whether the first geographical location can be prioritized;
   in response to determining that the first geographical location can be prioritized, publishing, by one or more computer processors, a second message to a second logical channel of the plurality of logical channels, wherein the vehicle is a subscriber to the second logical channel and wherein the second message indicates an updated route for the vehicle where the first geographical location is prioritized; and
   in response to determining that the first geographical location cannot be prioritized, publishing a third message to a third logical channel of the plurality of logical channels, wherein a user that transmitted the first message is a subscriber to the third logical channel and wherein the third message indicates that the first geographical location cannot be prioritized.

2. The method of claim 1, wherein the first message further indicates a requested time of arrival for the vehicle at the first geographical location and wherein the updated route allows the vehicle to arrive at the first geographical location at the requested time of arrival.

3. The method of claim 1, further comprising:
   receiving from the vehicle, another message indicating a second live geographical location of the vehicle.

4. The method of claim 3, further comprising:
   publishing a fourth message to the third logical channel of the plurality of logical channels, wherein the fourth message indicates the second live geographical location of the vehicle.

5. The method of claim 4, wherein the vehicle is to deliver a package to the first geographical location.

6. The method of claim 5, wherein a user that is subscribed to the third logical channel is associated with the package.

7. The method of claim 1, further comprising:
   receiving another message on the first logical channel of the plurality of logical channels, wherein the another message comprises a second request to remove a second geographical location from the route; and
   publishing a fourth message to the second logical channel of the plurality of logical channels, wherein the fourth message indicates a second updated route for the vehicle that does not include the second geographical location.

8. The method of claim 1, further comprising:
   receiving another message on the first logical channel of the plurality of logical channels, wherein the another message comprises a second request to add a second geographical location to the route; and
   publishing a fourth message to the second logical channel of the plurality of logical channels, wherein the fourth message indicates a second updated route for the vehicle that includes the second geographical location.

9. An apparatus, comprising:
   a memory; and
   one or more computer processors, operatively coupled with the memory, to:
   receive a first message on a first logical channel of a plurality of logical channels, wherein the first logical channel is associated with a vehicle that is traveling on a route and wherein the first message comprises a request to prioritize a first geographical location of the route;
   determine whether the first geographical location can be prioritized;
   in response to determining that the first geographical location can be prioritized, publish a second message to a second logical channel of the plurality of logical channels, wherein the vehicle is a subscriber to the second logical channel and wherein the second message indicates an updated route for the vehicle where the first geographical location is prioritized; and
   in response to determining that the first geographical location cannot be prioritized, publish a third message to a third logical channel of the plurality of logical channels, wherein a user that transmitted the first message is a subscriber to the third logical channel and wherein the third message indicates that the first geographical location cannot be prioritized.

10. The apparatus of claim 9, wherein the first message further indicates a requested time of arrival for the vehicle at the first geographical location and wherein the updated route allows the vehicle to arrive at the first geographical location at the requested time of arrival.

11. The apparatus of claim 9, wherein the one or more computer processors are further to:
    receive from the vehicle, another message indicating a second live geographical location of the vehicle.

12. The apparatus of claim 11, wherein the one or more computer processors are further to:
    publish a fourth message to the third logical channel of the plurality of logical channels, wherein the fourth message indicates the second live geographical location of the vehicle.

13. The apparatus of claim 12, wherein the vehicle is to deliver a package to the first geographical location.

14. The apparatus of claim 13, wherein a user that is subscribed to the third logical channel is associated with the package.

15. The apparatus of claim 9, wherein the one or more computer processors are further to:
    receive another message on the first logical channel of the plurality of logical channels, wherein the another message comprises a second request to remove a second geographical location from the route; and
    publish a fourth message to the second logical channel of the plurality of logical channels, wherein the fourth message indicates a second updated route for the vehicle that does not include the second geographical location.

16. The apparatus of claim 9, wherein the one or more computer processors are further to:

receive another message on the first logical channel of the plurality of logical channels, wherein the another message comprises a second request to add a second geographical location to the route; and publish a fourth message to the second logical channel of the plurality of logical channels, wherein the fourth message indicates a second updated route for the vehicle that includes the second geographical location.

17. A non-transitory computer-readable medium having instruction stored thereon that, when executed by one or more computer processors, cause the one or more computer processors to:

receive a first message on a first logical channel of a plurality of logical channels, wherein the first logical channel is associated with a vehicle that is traveling on a route and wherein the first message comprises a request to prioritize a first geographical location of the route;

determine whether the first geographical location can be prioritized;

in response to determining that the first geographical location can be prioritized, publish a second message to a second logical channel of the plurality of logical channels, wherein the vehicle is a subscriber to the second logical channel and wherein the second message indicates an updated route for the vehicle where the first geographical location is prioritized; and in response to determining that the first geographical location cannot be prioritized, publish a third message to a third logical channel of the plurality of logical channels, wherein a user that transmitted the first message is a subscriber to the third logical channel and wherein the third message indicates that the first geographical location cannot be prioritized.

18. The non-transitory computer-readable medium of claim 17, wherein the first message further indicates a requested time of arrival for the vehicle at the first geographical location and wherein the updated route allows the vehicle to arrive at the first geographical location at the requested time of arrival.

\* \* \* \* \*